Dec. 9, 1952 R. F. STEHLIK 2,621,256

CALLING LINE INDENTIFICATION APPARATUS

Filed July 8, 1949 6 Sheets-Sheet 1

*INVENTOR.*
Rudolph Frank Stehlik
*BY*
Smith, Olsen & Baird
Attys.

Dec. 9, 1952 R. F. STEHLIK 2,621,256

CALLING LINE INDENTIFICATION APPARATUS

Filed July 8, 1949 6 Sheets-Sheet 2

INVENTOR.

Rudolph Frank Stehlik

BY

Smith, Olsen & Baird

Attys.

INVENTOR.
Rudolph Frank Stehlik
BY
Smith, Olsen & Baird
Attys.

CALLING LINE INDENTIFICATION APPARATUS

Filed July 8, 1949 6 Sheets-Sheet 4

INVENTOR.
Rudolph Frank Stehlik
BY
Smith, Olsen & Baird
Attys.

Dec. 9, 1952 R. F. STEHLIK 2,621,256

CALLING LINE INDENTIFICATION APPARATUS

Filed July 8, 1949 6 Sheets-Sheet 5

INVENTOR.
Rudolph Frank Stehlik
BY
Smith, Olsen & Baird
Attys.

INVENTOR.
Rudolph Frank Stehlik
BY Smith, Olsen & Baird
Attys.

Patented Dec. 9, 1952

2,621,256

UNITED STATES PATENT OFFICE 2,621,256

CALLING LINE IDENTIFICATION APPARATUS

Rudolph Frank Stehlik, Antwerp, Belgium, assignor to Automatic Electric Laboratories, Inc., Chicago, Ill., a corporation of Delaware Application July 8, 1949, Serial No. 103,731

32 Claims. (Cl. 179—18)

Figure 1:
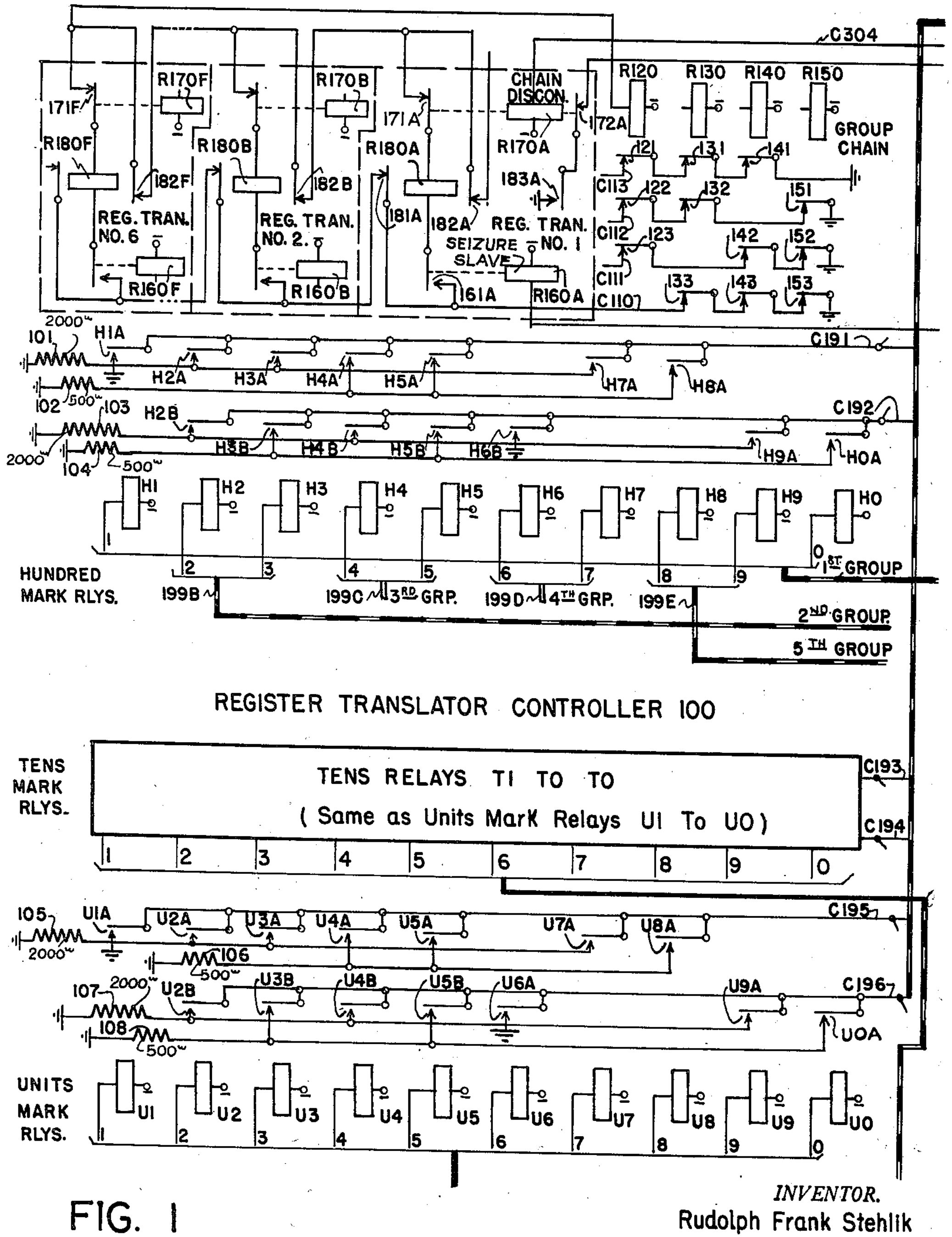

The present invention relates to telephone systems and more particularly to those systems in which the numerical designation of a calling subscriber line is automatically determined and registered incident to the extension of a telephone connection from a calling subscriber substation. More specifically, the present invention relates to improved line identification apparatus adapted to be incorporated in an automatic recording telephone system of the character of that disclosed in the John E. Ostline Patent No. 2,369,071, granted February 6, 1945.

In an automatic recording telephone system, such, for example, as that disclosed in the above-mentioned Ostline patent, the subscriber lines are divided into groups of 200 lines and a group of register translators is provided for each group of 2000 lines. A calling line is associated with a register translator in the appropriate group by means of line finder switches of the vertical and rotary type and each line finder has two sets of wipers. Consequently, each line finder has access to 200 lines. Furthermore, a register translator finder is associated with each line finder and it, in turn, has access to the various register translators in the corresponding group of register translators. With regard to the registration of a calling subscriber line number, the 2000 line group including a particular calling line is determined by a permanent connection in the selected register translator since, as stated above, each register translator in the particular group of translators serves a particular group of 2000 subscriber lines. In a small office serving, for example, 1000 lines or less, the thousands digit of the calling line number is determined by a permanent connection in the register translator while in an exchange of larger capacity, the thousands digit and the two hundred line group including the calling subscriber line is determined by the particular finder switch over which the register translator is seized. The hundreds digit is determined by the set of wipers over which the calling subscriber line is seized by the line finder and the tens and units digits are determined and registered in the register translator by controlling appropriate switches therein to be operated in synchronism with the vertical and rotary stepping operations of the line finder in finding the calling subscriber line.

While the method and apparatus employed in the system disclosed in the above-mentioned Ostline patent for determining the identification of the numerical designation of a calling subscriber line is entirely satisfactory in operation, it has been found that it is necessary to alter the register translators serving the different groups of subscriber lines to provide different permanent wiring connections corresponding respectively to the different 2000 line groups of subscriber lines being served by the respective groups of register translators. From the foregoing, it will be seen that the register translators cannot be interchanged between the different groups without first rearranging the so-called permanent wiring connections identifying the different 2000 line groups. In other words, the register translators in the above-mentioned Ostline patent cannot be uniformly wired so that they may be used indiscriminately in any one of the different register translator groups without change in the permanent wiring. In addition to the foregoing, each subscriber line in a 200-line group must be terminated in a particular set of terminals in the 200 point line finder switch bank, corresponding to the hundreds, tens and units digits of the numerical designation of the particular line. This particular wiring arrangement of the subscriber line is apparent since the wiper set, the number of vertical steps of the wipers and the number of rotary steps of the wipers in the line finder determine resectively the hundreds, tens and units digits of the calling subscriber line number. From the foregoing, it will be seen that in the above-mentioned Ostline patent there is a definite relationship between the set of wipers used by the finder in finding the calling line and the position of the set of wipers in connecting to the set of terminals in the associated contact bank terminating the calling subscriber line and the value of the hundreds, tens and units digits of the directory number of a calling subscriber line. Consequently, if the termination of a subscriber line is changed from one set of terminals to another set of terminals in the contact bank accessible to the set of wipers of the line finder, the digits of the directory number of that particular subscriber must also be changed so that they correspond respectively with the wiper set having access to the set of terminals now terminating the subscriber line, the number of vertical steps and the number of rotary steps that the set of wipers must take to find and connect with the set of terminals now terminating the calling subscriber line.

Accordingly, it is an object of the present invention to provide in an automatic recording telephone system improved line finder switching apparatus which will automatically find the terminals of a calling subscriber line and which will automatically register, in a register translator, the directory number of the calling subscriber line regardless of whether or not the directory number corresponds to the number of the terminal in the banks of the line finder terminating the particular calling subscriber line.

Another object of the invention is to provide in a telephone system of the type noted an improved line finder switching mechanism and common control equipment therefor which is automatically controlled in response to a call on any subscriber line to find the terminal in the banks of the finder terminating the calling line and to cause the association of a register translator with the line finder whereby the directory number of the calling subscriber line is automatically registered in the register translator before the calling subscriber line can be connected to the associated register translator.

A further object of the invention is to provide in a telephone system of the character noted register translators which are adapted to be used in any one of a plurality of different groups of register translators and wherein each group of register translators serves a different group of 2000 subscriber lines.

A still further object of the invention is to provide in a telephone system arranged to identify directory numbers of calling subscriber lines a register translator control unit which is common to all of the groups of line finders and to all of the translators in a group of translators and which is adapted to be controlled in accordance with at least a predetermined number of digits in the directory number of the calling subscriber line and to simultaneously register in a selected one of the register translators the predetermined number of digits of the directory number before the register translator control unit may be rendered available to control another register translator.

A still further object of the invention is to provide in a telephone system arranged to identify the directory numbers of calling subscriber lines a register translator controller which is common to all of the register translators and which is jointly controlled in accordance with the position of a line finder connected to a calling subscriber line and a selected one of the register translators to register at least a portion of the directory number of the calling subscriber line and which simultaneously transfers to the selected register translator the registered portion of the calling subscriber directory number.

A still further object of the invention is to provide in a telephone system of the type noted a common register translator controller which is arranged to control the register translators one at a time and which prevents more than one register translator in a group of register translators from being associated with the common register translator controller.

A still further object of the invention is to provide in a telephone system of the type noted an improved arrangement for transferring the various digits of the calling subscriber number from the common register translator controller to the registers in the register translator by means of different voltages applied to the register control conductors in different code combinations.

Further objects and features of the invention pertain to the particular arrangement of the circuit elements of the system whereby the above-outlined and additional features are attained.

Figure 2:
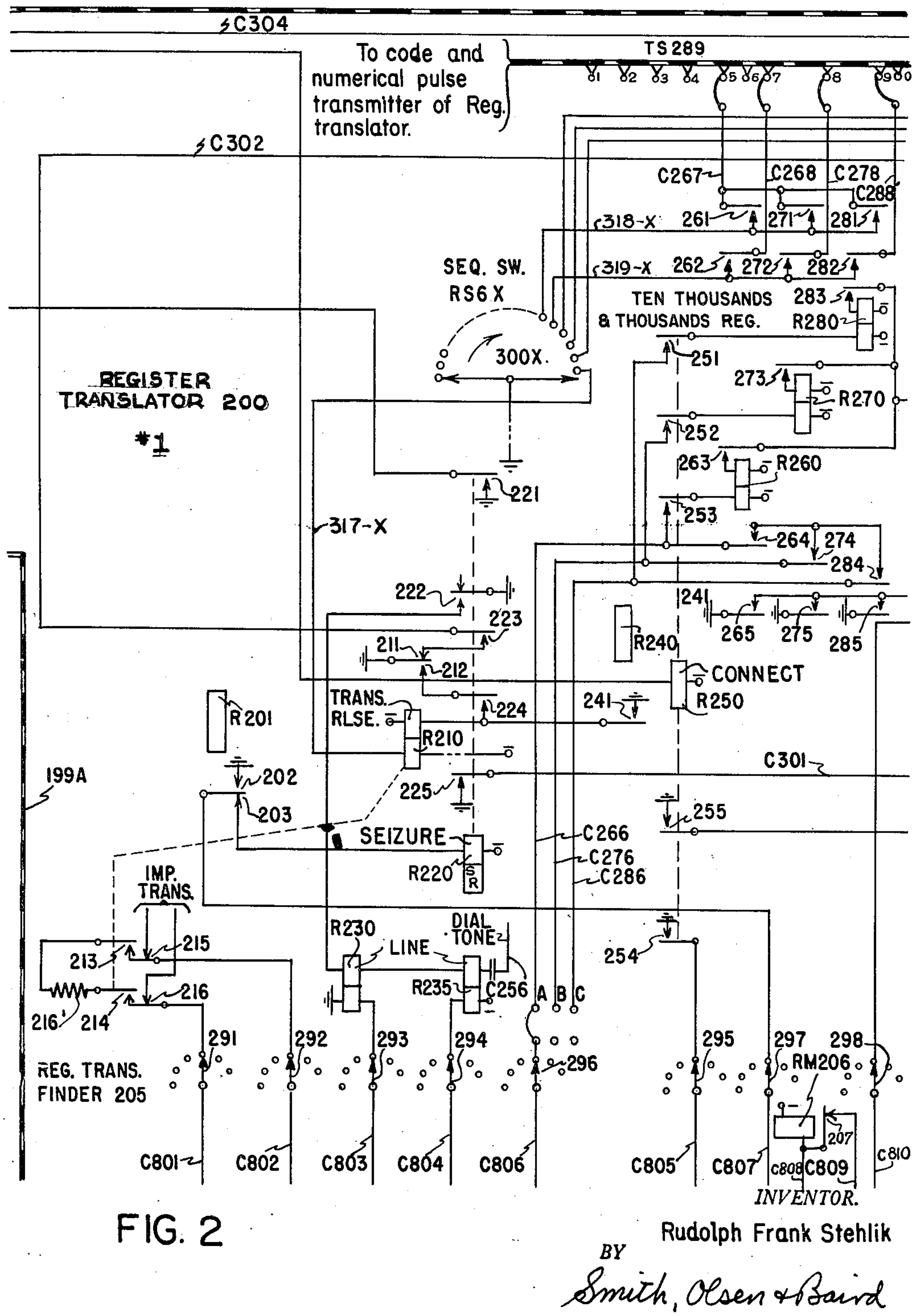
Figure 3:
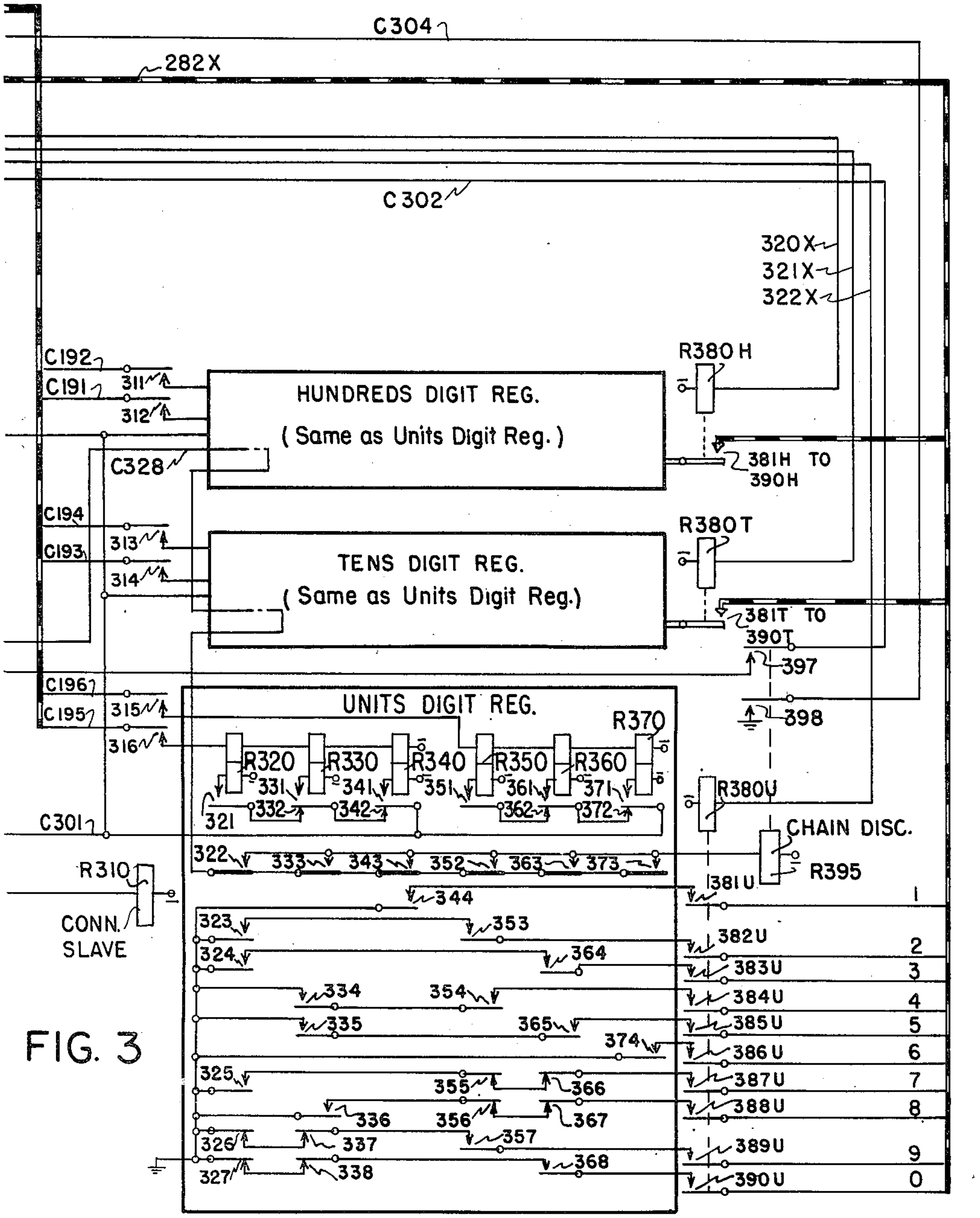
Figures 4, 7:
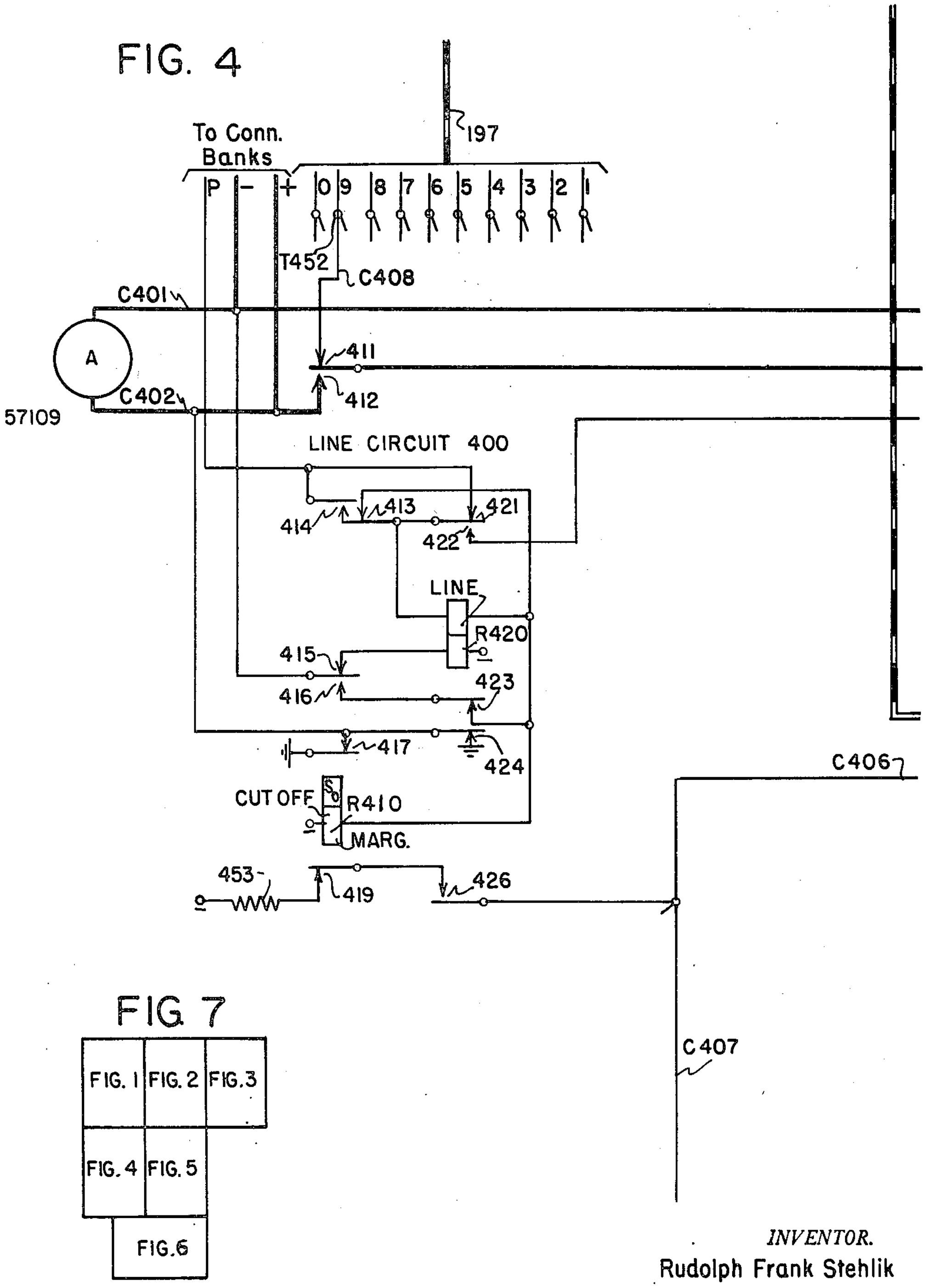

The invention, both as to its organization and method of operation, together with further objects and advantages thereof, will best be understood by reference to the following specification taken in connection with the accompanying drawings, in which Figs. 1 to 6, inclusive, illustrate the apparatus incorporated in the telephone system, which apparatus has included therein the features of the invention as briefly outlined above; and Fig. 7 illustrates the mode of combining Figs. 1 to 6, inclusive, to form a unified system.

Referring now to the drawings, Fig. 1 discloses the register translator controller 100 which includes 10 hundreds marking relays H1 to H0, inclusive; 10 tens marking relays T1 to T0, inclusive (not shown); and 10 units marking relays U1 to U0, inclusive. These marking relays are adapted to be controlled in accordance with the hundreds, tens and units digits of the directory number of a calling subscriber line, in a manner to be described hereinafter, and are common to a group of line finder switches and to the group of register translators which serve such line finder switches.

In the present system it is assumed, for example, that a group of 24 register translators is provided, which group is divided into four subgroups, each subgroup comprising six register translators and that the group of register translators are utilized in establishing connections for 3000 subscriber lines accessible to the line finder switches. Fig. 1 also discloses four group chain relays R120, R130, R140 and R150, each of which is individual to one of the four subgroups of register translators. Each of the six register translators in a subgroup includes a seizure slave relay, such as relay R160A, a chain test relay, such as relay R180A, and a chain disconnect slave relay, such as relay R170A. These relays are connected and arranged in a chain circuit in order to control the group chain relay common to a subgroup of register translators including the register translator seized for a telephone connection. The operation of a particular group chain relay disconnects the chain circuits for the common group chain relays in each of the other subgroups of register translators and thereby prevents the association of the register translator controller 100 with more than one register translator in the group of 24 register translators.

Figs. 2 and 3 disclose certain elements in the register translator 200 included in the group of 24 register translators. This register translator has been only partially illustrated since it is of the type disclosed in the Ostline Patent No. 2,369,071, previously noted, and includes various modifications which have been shown in detail to incorporate therein the features of the invention, whereby the calling subscriber directory number is registered therein under control of the register translator controller 100. However, it should be understood that any register translator may be used provided it is similar to the register translator shown in the above-mentioned Ostline patent and also provided it is modified in the manner disclosed herein to register the directory number of a calling subscriber line. The various operations of the register translator 200 with respect to registering the digits of a called number as dialed by a calling subscriber, to set up a connection between a calling and a called subscriber, to transfer the items of record information pertaining to a connection to a subsequent switching stage for the purpose of producing a record of the call and other details of the operation of the register translator are disclosed and described in the above-mentioned Ostline Patent No. 2,369,071. Since the operation of the register translator in the present application is primarily concerned with the registration of a calling subscriber directory number, the detail description of the operation of the register translator will be limited to this phase of the present invention.

Fig. 2 also discloses a register translator finder 205 which has access to the subgroup of register translators including the register translator 200. The register translator finder 205 is individual to the line finder 500 and is operative to find and connect an idle register translator to the line finder 500.

Fig. 4 schematically illustrates an individual subscriber substation A of conventional construction and arrangement including a telephone instrument, a ringer and a calling device or dial. The line of the subscriber at substation A terminates in the exchange apparatus in a line circuit 400 individual thereto and in the banks of the line finders, such as the finder 500 included in the group of line finders having access to the subscriber line. Fig. 4 also shows a terminal block connecting a conductor individual to the line circuit 400 whereby the units marking relays in the register translator controller 100 are controlled in accordance with the particular units digit of the directory number of the calling subscriber at station A.

Figure 5:
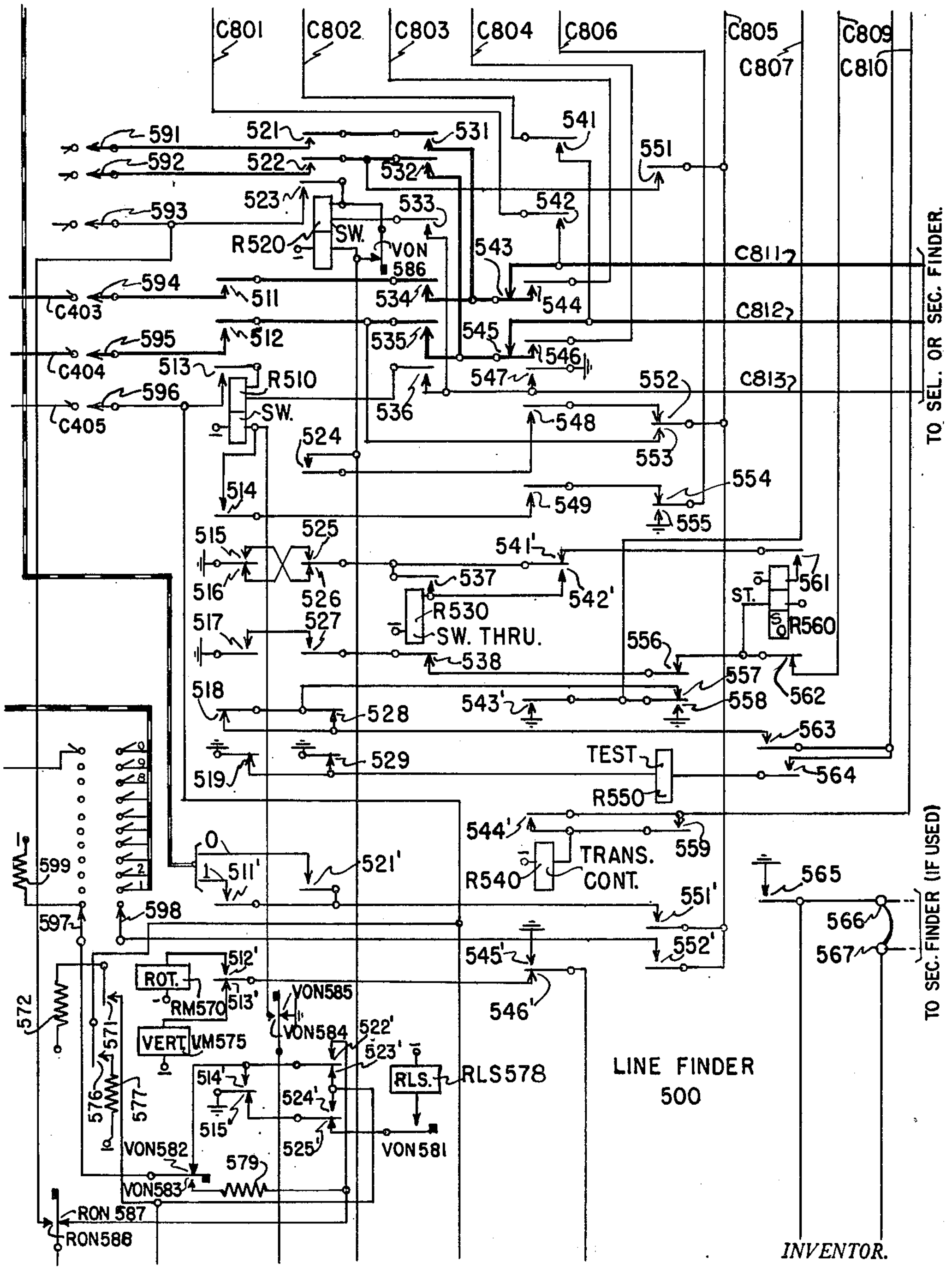

Fig. 5 discloses a line finder 500 provided with two sets of wipers and two sets of associated bank contacts. The two sets of wipers are arranged to search over the associated sets of bank contacts simultaneously to find and connect with a calling subscriber line in either one of the two groups of 100 subscriber lines terminating respectively in the two sets of bank contacts.

Figure 6:
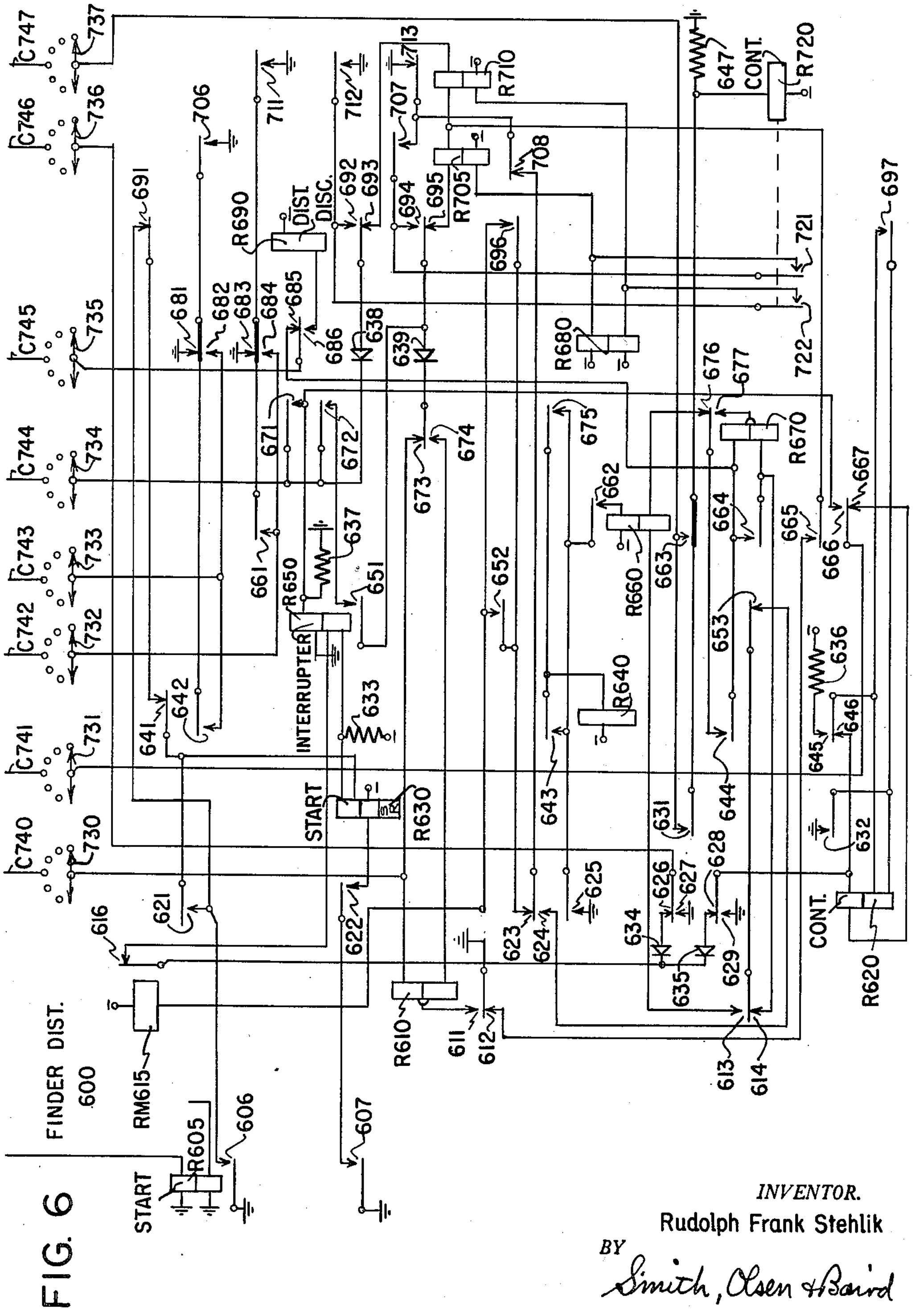

Fig. 6 discloses a finder distributor 600 arranged to preselect an idle finder in the group of line finders having access to the group of subscriber lines including the subscriber line individual to station A and to control the selected finder to search for and find a particular calling subscriber line.

The line circuit 400, the distributor 600 and the line finder 500 may be, for example, of the type disclosed in the Taylor et al. Patent No. 1,914,540, granted June 20, 1933, and the grouping of such equipment may be arranged in the manner disclosed in the said patent. It should be understood however, that in the present system the line circuit 400, the distributor 600 and the line finder 500 have been modified to incorporate therein the features of the present invention whereby the hundreds, tens and units digits corresponding to the directory number of a calling subscriber line are temporarily stored in the common register translator controller 100 and transferred therefrom to corresponding registers in a selected one of the register translators.

The operation of the telephone system whereby the directory number of a calling subscriber line is registered in the register translator will now be described. It will, therefore, be assumed that the subscriber at substation A, whose directory number is 57109, initiates a call by removing the receiver of the telephone instrument from the associated switchhook. In response to the removal of the receiver, a loop circuit is completed for operating the line relay R420 in the line circuit 400 individual to the calling substation A. The circuit for operating relay R420 may be traced from battery by way of the lower winding of relay R420, the contacts 415, the line conductor C401, the telephone instrument at substation A, the conductor C402 and to ground by way of either the contacts 417 or 424. Relay R420, upon operating, at contacts 421 and 422 disconnects the winding of the cut-off relay R410 from the pivate normal conductor P extending to the banks of all connectors having access to the calling subscriber line and it connects the winding of the cut-off relay R410 to the conductor C405 in order to mark the rotary bank contact of all line finders having access to the group of lines including the calling line. Also, at its contacts 426, the relay R420 connects a battery marking potential by way of a resistor, such as the resistor 453 (one provided per calling level in the finders) the contacts 419 and 426 and the conductor C406 in order to mark the level in which the calling line is terminated in the vertical bank multiple of all line finders having access to the group of lines including the calling line. The battery marking potential applied to conductor C406 is also extended by way of the conductor C407 and the upper winding of the start relay R605 to ground in order to operate the latter relay and thus initiate operation of the finder distributor 600 having access to the group of finders serving the calling subscriber line.

It may be well to mention at this time that since the line finders, such as the line finder 500, are provided with two sets of wipers arranged to hunt over an upper and lower set of bank contacts simultaneously and since the start relay R605 is one of five such relays, each of the relays R605 will serve 40 lines comprising two levels of 20 subscriber lines each.

Referring again to the operation of the start relay R605, at its contacts 606, it completes an operating circuit for the start relay R630 in the finder distributor 600 over a circuit which may be traced from ground by way of the contacts 606, 691 and 641, the upper winding of the relay R630 and the resistor 633, to battery. Relay R630, upon operating, at its contacts 632, completes a circuit for operating the control relay R620, provided the distributor 600 has preselected an idle line finder, such as the line finder 500. The circuit for operating relay R620 may be traced from ground by way of the contacts 632, the lower high resistance winding of the relay R620, the contacts 646, the upper low resistance winding of the relay R620, the contacts 667, the wiper 731, the conductor C741 (assuming that the line finder 500 has been preselected), the contacts 523′, the vertical off-normal contacts VON582, the vertical wiper 597 (which is normally in engagement with the bottom vertical bank contact) and the resistor 599 which is common to a plurality of finders, to battery.

Before proceeding further with the description of operation which follows the operation of relay R620, the preselection of an idle finder by the finder distributor 600 will first be described. For example, if the line finder engaged by the finder distributor 600 is busy, a ground potential is applied to the conductor C746 from contacts 565 in the busy line finder. This ground potential is extended by way of the wiper 736, the contacts 626, the rectifier 634, the interrupted contacts 616 on the rotary stepping magnet RM615, the lower high resistance winding of the interrupter relay R650 and the resistor 633, to battery. Relay R650 operates when the above-traced circuit is completed. The function of the rectifier 634 in the above-traced circuit and the rectifier 635 is to prevent false operation of the relay R620. The relay R650, upon operating, at its contacts 652, completes an operating circuit for the rotary stepping magnet RM615 of the finder distributor 600 from ground at contacts 713 and then by way of the contacts 708, 623 and 652 and the winding of the magnet RM615, to battery. The magnet RM615, upon operating, prepares for the advancement of the wipers 730 to 737, inclusive, into engagement with the next set for contacts and it interrupts, at its contacts 616, the previously traced circuit for operating the relay R650. The relay R650 now restores to normal and, at its contacts 652, opens the previously traced circuit for operating the magnet RM615 which now restores to normal. Upon restoring to normal, the magnet RM615 advances the wipers 730 to 737, inclusive, one step thereby to engage the next set of bank contacts. In this manner, the relay R650 and the magnet RM615 interact to automatically advance the wipers step-by-step in a rotary direction until the wiper 736 engages an associated contact terminating an idle finder. Accordingly, an idle finder is automatically preselected for use.

In order to prevent incorrect operation in the event that there is a disconnection in the circuit including the bank contact engaged by the wiper 731, a test is made over this wiper for a battery marking potential when the finder distributor 600 is operated in response to a call. If battery potential is found by the wiper 731, the relay R650 is shunted and the relay R620 is operated over the previously traced circuit including both of its windings in series. If, however, the line finder is not marked as idle by the presence of the battery potential on conductor C741, the relay R650 operates in series with relay R620 over a circuit which may be traced from ground at the contacts 632 of the operated start relay R630 and then by way of the lower winding of the relay R620, contacts 646 and 628, the rectifier 635, the contacts 616, the lower winding of relay R650 and the resistor 633, to battery. Relay R650, upon operating, interacts with the magnet RM615, as previously described, to cause the wipers 730 to 737, inclusive, of the finder distributor 600 to be advanced into engagement with the next idle finder.

Referring again to the relay R620, it is noted that when the relay operates in the manner previously explained, at its contacts 629, it connects ground potential to its low resistance upper winding in order to maintain the relay in its operated position and in order to mark the bank contact engaged by the wiper 731 as busy to other distributors. At its contacts 621, the relay R620 completes a parallel circuit for the upper winding of the start relay R630, which circuit is independent of the contacts 641 and 691. Also, at its contacts 622, the relay R620 completes a locking circuit for the lower winding of the relay R630. In addition to the foregoing, relay R620, at its contacts 624, completes a circuit for operating the relay R670 in series with the vertical magnet VM575 of the line finder 500, over a circuit which may be traced from ground and then by way of the contacts 713, 708, 624, 653 and 614, the low resistance lower winding and the high resistance upper winding of the relay R670, the contacts 685, the wiper 735, the conductor C745, the contacts 546′ and 513′ and the winding of the vertical magnet VM575, to battery. Due to the high resistance of the upper winding of the relay R670, the vertical magnet VM575 does not operate at this time but the relay R670 operates. Finally, at its contacts 627, the relay R620 completes an operating circuit for the control relay R720 from ground by way of the contacts 627, the wiper 736, the conductor C746, the terminals 566 and 567, the conductor C747, the wiper 737, the contacts 631 and the winding of the relay R720, to battery. The operation of the relay R720 at this time merely prepares circuits, at its contacts 721 and 722, for subsequently controlling the relays R680, R705 and R710.

In response to the operation of relay R670 in the manner described above, it completes, at its contacts 675, a circuit including the contacts 625 for operating the vertical control relay R640. The latter relay, upon operating, at its contacts 643, completes a direct locking circuit for itself from ground at contacts 625. As a further result of the operation of relay R670, at its contacts 671, it connects the low resistance upper winding of the relay R650 to the wiper 734 to which battery potential will be applied in response to each operation of the vertical magnet VM575 in the finder 500. At its contacts 674, the relay R670 also prepares a point in the circuit for the high resistance lower winding of the relay R610; at its contacts 677, it prepares an alternative circuit for operating the vertical magnet VM575 in series with the low resistance lower winding of relay R670; and, at its contacts 672, it prepares a point in the circuit for the high resistance upper winding of relay R705.

In response to the previously described operation of the vertical control relay R640, at its contacts 644, it short-circuits the high resistance upper winding of the relay R670 in order to increase the current in the circuit sufficiently to cause the operation of the vertical magnet VM575 in series with the low resistance lower winding of relay R670. Also, upon operating, the relay R640, at its contacts 642, completes an operating circuit for the switching relay R520 in the finder 500. The last-mentioned circuit may be traced from ground at contacts 681 and then by way of the contacts 642, the wiper 733, the conductor C743 and the winding of relay R520, to battery. Also, at its contacts 641, the relay R640 opens a point in the initial operating circuit for the relay R630 but the latter relay remains in its operated position over independent locking circuits including its upper and lower windings. Finally, at its contacts 645, the relay R640 completes a locking circuit for the relay R620, which locking circuit includes ground at the contacts 632, the high resistance lower winding of relay R620, the contacts 645 and the resistor 636 and battery. The completion of the above-mentioned locking circuit for relay R620 is delayed until the relay R640 is operated so that in the event two finder distributors are used and are connected to the same line finder, one of the relays R620 of the two distributors may restore to normal and cause the corresponding finder distributor to continue its searching operation for another idle finder since the adjustment of these relays is such that two relays cannot remain operated over a circuit including the marking battery potential of the same line finder over their respective low resistance upper windings.

When the switching relay R520 in the line finder 500 operates, as noted above, at its contacts 523′, it disconnects the battery marking potential from the conductor C741 and the associated wiper 731 and, at its contacts 524′, it substitutes in place thereof a ground potential thereby to short-circuit the low resistance upper winding of the relay R620. The relay R620, however, does not restore to normal since it is retained in its operated position over the previously described locking circuit including its lower winding.

Incident to the previously described operation of the vertical magnet VM575, which operation takes place at substantially the same time as the operation of the switching relay R520, the two sets of wipers 591 to 593, inclusive, and 594 to 596, inclusive, of the finder 500 will be raised to a position opposite the first level of their respective sets of bank contacts and at the conclusion of the magnet stroke the contacts 576 will close thereby to complete an operating circuit for the upper winding of the interrupter relay R650. The circuit for operating the relay R650 may be traced from ground and then by way of the low resistance upper winding of relay R650, the contacts 671, the wiper 734, the conductor C744, the contacts 576 and the resistor 577, to battery. The relay R650, upon operating, at its contacts 653, opens a point in the operating circuit for the vertical magnet VM575 which now restores to normal and opens, at its contacts 576, the above-described circuit for relay R650, which also restores to normal. It may be well to mention at this time, however, that due to the short-circuit around the upper winding of the relay R670, the latter relay is somewhat slow-to-release and therefore remains in its operated position during the stepping of the vertical magnet VM575. As soon as the relay R650 restores to normal, it recompletes, at its contacts 653, the series circuit for the vertical magnet VM575 and the lower winding of relay R670. From the foregoing description of the mode of operation of the vertical magnet VM575 and the relay R650, it will be seen that they interact to cause two sets of wipers 591 to 596, inclusive, and the vertical test wipers 597 and 598 to be raised to the level in the associated contact bank terminating the calling subscriber line.

As soon as the wipers of the line finder 500 are raised one step from their normal resting positions, the vertical off-normal contacts VON582, VON585 and VON586 are opened, and the contacts VON581, VON583 and VON584 are closed. The opening of the vertical off-normal contacts VON582 disconnect a further point in the circuit for indicating that the finder 500 is idle; the contacts VON585 disconnect the ground potential from the conductor C742 and the contacts VON586 disconnect a point in the circuit including the upper and lower windings of relay R520. The contacts VON581 prepare a point in the circuit for the release magnet RLS578; the contacts VON583 prepare a point in the test circuit for controlling the relay R610; and the contacts VON584 prepare a point in the circuit for operating the switching relay R510 in the line finder 500.

When the level of the associated contact bank including the calling line is located, the vertical wiper 597 encounters the contact in the vertical bank to which battery potential has been applied in response to the operation of the line relay R420 individual to the calling subscriber line. When this contact is encountered by the vertical wiper 597, a circuit is completed which may be traced from the battery potential at the line circuit 400 and then by way of the resistor 453, the contacts 419 and 426, the conductor C406, the bank contact engaged by the vertical wiper 597, the contacts VON583, the resistor 579, the rotary off-normal contacts RON587, the conductor C740, the wiper 730, the upper and lower windings of the relay R610 in series, the contacts 674, the rectifier 639, the contacts 651, 672, and 671 and the winding of relay R650, to ground.

It may be well to mention at this time that when the vertical magnet VM575 operated to raise the vertical wiper 597 into engagement with the contact terminating the marking conductor C406 it also completed, at its contacts 576, the previously described circuit including the contacts 611 for operating the relay R650 over its upper winding. When the relay R650 operated, it opened its contacts 653 in order to interrupt the circuit for the vertical magnet VM575, and simultaneously therewith, it completed, at its contacts 651, the above-mentioned circuit for its upper winding from the marking battery potential on the conductor C406. Consequently, the relay R650 is retained in its operated position and the relay R610 is operated in series therewith. Accordingly, further vertical movement of the wipers is prevented. When this circuit is completed, the relay R610 operated and, at its contacts 611, it short-circuits its high resistance lower winding and remains locked in its operated position over the circuit including its low resistance upper winding and the marking battery potential applied to the conductor C406. The low resistance ground potential applied to the conductor C406 also serves to busy the vertical level terminating the conductor C406 to all other finders and prevents two finders from engaging the same vertical level. Also, at its contacts 611, the relay R610 short-circuits the upper winding of the relay R650 over a circuit which may be traced from ground by way of the contacts 611, the lower winding of the relay R610, the contacts 674, the rectifier 639, the contacts 651, 672 and 671 and the upper winding of relay R650, to ground. The relay R650 now restores and prepares, at its contacts 653, a point in the circuit, traced hereinafter, for controlling the rotary magnet RM510. As a further result of the operation of relay R610, at its contacts 614, it interrupts a point in the previously described circuit for controlling the relay R670 in series with the vertical magnet VM575 and thus terminates the vertical movement of the wipers. Finally, at its contacts 613, the relay R610 prepares a point in the circuit for operating the relay R660 in series with the vertical magnet VM575.

In view of the foregoing, it will be understood that the opening of the series circuit for the relay R670 and the vertical magnet VM575 terminates the vertical stepping and also causes the relay R670 to restore to normal. Consequently, when the relay R670 restores to normal, at its contacts 676, it completes the previously mentioned circuit for operating the relay R660 in series with the vertical magnet VM575. This circuit may be traced from battery and then by way of the vertical magnet VM575, the contacts 513′ and 546′, the conductor C745, the wiper 735, the contacts 685, 644 and 676, the lower winding of the relay R660, the contacts 613, 653, 624, 708 and 713 to ground. Due to the high resistance of the lower winding of the relay R660, the vertical magnet VM575 does not operate in this circuit but the relay R660 immediately operates and, at its contacts 62, completes a locking circuit for its upper winding from ground at contacts 625. As a further result of the operation of relay R660, at its contacts 661 it completes a circuit for operating the switching relay R510 over a circuit which may be traced from ground and then by way of the contacts 683 and 661, the wiper 732, the conductor C742, the contacts VON584 and the lower winding of relay R510, to battery.

At the present time, the two switching relays R510 and R520 in the line finder 500 are in their operated positions and they will remain in their operated positions during the rotary movement of the wipers under control of the rotary magnet RM570. As a further result of the operation of relay R660, at its contacts 663, it completes a multiple circuit for retaining the relay R720 in its operated position; at its contacts 664, it short-circuits the upper and lower windings of the relay R670; at its contacts 665, it prepares a point in the circuit traced hereinafter for controlling the relays R705 and R710; and, at its contacts 666, it prepares a point in the circuit for controlling the relay R650 during the rotary stepping of the wipers of the finder 500 under control of the rotary magnet RM570.

The apparatus is now in condition to rotate the wipers of the line finder 500 over the contacts of the selected level in order to search for the contacts terminating the conductors of the calling subscriber line. The rotary operation of the wipers is initiated in response to the operation of relay R510. More specifically, when the relay R510 operates it completes, at its contacts 514′, a short-circuit around the upper winding of the relay R610. This circuit may be traced from ground and then by way of the contacts 514′ and 522′, the rotary off-normal contacts RON587, the conductor C740, the wiper 730, the upper winding of relay R610 and the contacts 611, to ground. The short-circuiting of the upper winding of the relay R610 causes the relay to restore to normal and complete, at its contacts 612 and 614 circuits traced hereinafter for controlling the rotary magnet RM570 and the upper windings of the test relays R705 and R710. The relay R510, upon operating, at its contacts 512′ and 513′, also transfers the stepping circuit from the winding of the vertical magnet VM575 to the winding of the rotary magnet RM570. When this transfer is made, a circuit is completed from battery and then by way of the winding of the rotary magnet RM570, the contacts 512′ and 546′, the conductor C745, the wiper 735, the contacts 685, 664, 614, 653, 624, 708 and 713, to ground. The rotary magnet RM570 operates over the above-traced circuit and rotates the wipers 591 to 596, inclusive, into engagement with the first set of bank contacts in the selected level. The vertical wipers 597 and 598 are loosely connected to the wiper shaft so that they remain in engagement with the contacts in the vertical bank during the rotary stepping of the wipers 591 to 596, inclusive.

As soon as the above-mentioned wipers have been rotated from the normal rotary position, the rotary off-normal contacts RON587 are opened in order to disconnect the previously traced original operating circuit for the relay R610 and to now connect the test wiper 593 of the upper set of wipers to a circuit including the upper winding of the test relay R705. At the end of the stroke of the magnet RM570, the contacts 571 are closed to complete a circuit for again energizing the interrupter relay R650. This circuit may be traced from battery and then by way of the resistor 572, the contacts 571, the conductor C741, the wiper 731, the contacts 666 and the upper winding of the interrupter relay R650, to ground. The relay R650 operates when the above-mentioned circuit is completed and, at its contacts 653, interrupts the previously traced circuit for operating the rotary magnet RM570 which restores to normal and, at its contacts 571, interrupts the circuit for the relay R650 which also restores to normal. In this manner, the rotary magnet RM570 and the interrupter relay R650 interact until either the test wiper 593 in the upper wiper set or the test wiper 596 in the lower wiper set, encounters the marking battery potential applied to the test conductor of the calling line, such as the test conductor C405. From the foregoing it will be understood that the upper set of wipers 591 to 593, inclusive, and the lower set of wipers 594 to 596, inclusive, are simultaneously advanced step-by-step over the contacts of a selected level to search for the calling subscriber line.

It will be assumed that the test wiper 596 of the lower wiper set engages the marked bank contact terminating the conductor C405 individual to the calling subscriber line. When this occurs, a circuit will be completed for operating the test relay R710 in series with the cut-off relay R410 in the calling subscriber line circuit 400. This circuit may be traced from battery and then by way of the winding of the cut-off relay R410, the contacts 413 and 422, the test conductor C405, the test wiper 596, the conductor C744, the wiper 734, the rectifier 638, the contacts 693, the high resistance upper winding of the test relay R710, the contacts 665 and 612, to ground. The cut-off relay R410 cannot operate over this circuit due to the high resistance of the upper winding of the relay R710, but the latter relay operates at this time in order to retain the switching relay R510, associated with the wipers 594 to 596, inclusive, in its operated position and in order to restore the switching relay R520, individual to the wipers 591 to 593, inclusive, to its normal resting position.

More specifically, when the test relay R710 operates in the manner described above, it interrupts, at its contacts 713, the previously traced circuit for controlling the rotary magnet RM570 and thus terminates further rotation of the wipers of the line finder 500. Also, at its contacts 712, the relay R710 completes a circuit, including the contacts 722, for operating the relay R680 over a circuit including its lower winding and in multiple therewith it completes a locking circuit for itself including its low resistance lower winding. Finally, at its contacts 711, the relay R710 completes a multiple circuit including the contacts 684 and 661 for retaining the switching relay R510 in its operated position.

When the relay R680 operates in the manner described above, at its contacts 681, it interrupts a point in the previously traced circuit for the relay R520 which now restores to normal and, at its contacts 685 and 686, it disconnects the conductor C745 in the line finder 500 from the previously described stepping circuit and connects it to the winding of the relay R690.

During the rotary stepping operation of the wipers, the two switching relays R510 and R520 were in their operated positions. Certain additional operations were performed in the line finder 500 at the time the two mentioned switching relays were initially operated but in order to fully describe the cooperation between the finder distributor 600 and the line finder 500 to find a calling subscriber line, the said additional operations were omitted. Consequently, it is now necessary to refer back to the point of time in the sequence of operation of the equipment to the instant when the relays R510 and R520 were operated. With this condition in mind, it is noted that, at the contacts 517 and 527, the relays R510 and R520 complete multiple circuits for simultaneously operating the slow-to-operate start relay R560 and the rotary magnet RM206 of the register translator finder 205. This circuit may be traced from ground and then by way of the contacts 517, 527, 538 and 556, one branch of the circuit extending by way of the contacts 562 and the winding of the rotary magnet RM206 to battery, and the other branch of the circuit extending by way of the lower winding of the relay R560, to battery. Due to the slow-to-operate characteristics of relay R560, the magnet RM206 operates before its circuit is opened by contacts 562 in order to condition the wipers of the register translator finder 205 to be advanced one step. Accordingly, when the relay R560 operates, at its contacts 562, it opens the branch of the above-described circuit for controlling the rotary magnet RM206, which magnet now restores to normal. Incident to the restoration of the magnet RM206, the wipers 291 to 298, inclusive, of the register translator finder 205 are advanced one step to engage a set of contacts terminating a register translator. As a further result of the operation of relay R560, at its contacts 563 and 564, it prepares a point in an automatic stepping circuit for the rotary magnet RM206 and a test circuit for the test relay R550. The circuit for automatically advancing the wipers of the register translator finder is determined by the application of ground potential to the terminals in the bank engaged by the wiper 297. This terminal will be grounded either by a register translator connected thereto or by another line finder. The above-mentioned circuit for automatically advancing the wipers of the register translator finder 205 will not be completed, however, until one of the switching relays R510 or R520 is restored to normal at the end of the rotary stepping of the wipers 591 to 596, inclusive, of the line finder 500. As a further result of the operation of relay R560, at its contacts 565, it applies ground potential to the conductor C747 in order to maintain the relay R720 in the finder distributor 600 in its operated position.

In the previous description of the operation of the line finder 500 it was pointed out that when the wipers 594 to 596, inclusive, found the terminals in the associated bank terminating the calling subscriber line, the switching relay R510 was retained in its operated position and the switching relay R520 was restored to normal. When the switching relay R520 restores to normal, at its contacts 526, it completes a circuit including the contacts 515, 541′ and 561 for locking the relay R560 in its operated position. In addition thereto, the relay R520, at its contacts 528 and 529, simultaneously completes the automatic stepping circuit for the rotary magnet RM206 and a test circuit for the test relay R550. The test circuit includes the contacts 529, the winding of the test relay R550, the contacts 564, the interrupter contacts 207 and the winding of the magnet RM206, to battery. The automatic stepping circuit includes the wiper 297 of the register translator finder 205, the conductor C807, the contacts 557, 528 and 563, the interrupter contacts 207, and the winding of the rotary magnet RM206, to battery. When these circuits are completed, the test relay R550 will operate in series with the magnet RM206 provided the contact engaged by the wiper 297 is not marked with a busy marking ground potential from another line finder or from the engaged register translator. If the wiper 297 engages a grounded contact, the test relay R550 will be short-circuited and thus prevented from operating and the ground potential will cause the rotary magnet RM206 to be interruptedly operated to advance the wipers step-by-step until the wiper 297 engages a contact in the associated bank marked with a battery potential. At this time the winding of the test relay R550 will not be short-circuited and it operates in series with the magnet RM206 but due to the resistance of the relay R550, the magnet RM206 is prevented from operating. From the foregoing, it will be understood that the register translator finder 205 will automatically advance its wipers to engage an idle register translator and when this occurs, the test relay R550 will operate.

When the relay R550 operates, it prepares circuits, at its contacts 551, 553, 551′ and 552′ for registering the hundreds, tens and units digits of the directory number of the calling subscriber line in the common register translator controller 100. Also, at its contacts 556, the relay R550 opens a point in the initial operating circuit for the lower winding of the start relay R560, which relay is now locked in its operated position to ground at contacts 515. At its contacts 555, the relay R550 prepares a point in the circuit for registering the ten thousand digit and the thousand digit of the directory number of a calling subscriber line in the selected register translator. At its contacts 558, the relay R550 applies ground potential by way of the conductor C807, the wiper 297, the contacts 203, and the winding of the seizure relay R220, to battery.

The relay R220 in the register translator 200 operates over the above-described circuit and thus initiates further operations in the register translator 200, whereby the directory number of the calling subscriber line is registered therein, whereby the register translator 200 is utilized in registering the digits of the called subscriber number as transmitted from the calling subscriber substation, in order to control the setting up of the connection to the desired called subscriber and to control the transmission of items of information, including the calling subscriber directory number, to a subsequent switching stage in order to produce a record of the telephone connection.

When the seizure relay R220 operates in the manner described above, it completes, at its contacts 221, an obvious circuit for operating the seizure slave relay R160A. At its contacts 222, the relay R220 completes a circuit including the upper windings of the line relays R230 and R235 and the dial tone conductor C256 whereby the dial tone signal is subsequently transmitted through the lower windings of the line relays R230 and R235 to the calling subscriber line. At its contacts 223, the relay R220 applies ground potential to the conductor C302 and, at its contacts 225, it applies ground potential to the conductor C301.

Inasmuch as the register translator controller 100 is common to the group of 24 register translators, previously noted, provisions have been made for preventing the register translator controller 100 from being connected for the use of more than one register translator at a time. The 24 register translators have been divided into four subgroups of six register translators each and each subgroup is provided with a separate group chain relay which is arranged to disconnect the chain circuits for each of the four subgroups when any one of the group chain relays is operated. Accordingly, when the seizure slave relay R160A is operated, as noted above, at its contacts 161A, it completes a chain circuit for selectively controlling the chain test relay R180A individual to a register translator, such as the register translator 200, in one of the subgroups of the six register translators. As illustrated in the drawings, the register translator 200 is referred to as the register translator "No. 1." The chain circuit for the chain test relay R180A may be traced from ground and then by way of the contacts 153, 143 and 133, the conductor C110, the contacts 161A, the winding of the relay R180A, the contacts 171A, the contacts 182B to 182F, inclusive, associated with the five remaining chain test relays R180B to R180F, inclusive, and the winding of the chain group relay R120, to battery. The relays R180A and R120 operate in series when the above-traced circuit is completed. The relay R120, at its contacts 121, 122 and 123 disconnect the chain circuits including the conductors C113, C112 and C111, which chain conductors respectively are connected to the three remaining subgroups of register translators (wired and arranged in the same manner as the register translator Nos. 1 to 6, inclusive) thereby to interrupt respectively the circuits for controlling the remaining three group chain relays R130, R140 and R150. When the chain test relay R180A operates, at its contacts 181A, it interrupts the circuits for controlling the remaining chain test relays R180B to 180F, inclusive, in the associated chain. Accordingly, all of the remaining register translators in the group of 24 register translators are prevented from being associated with the register translator controller 100 and the register translator 200 may be connected to the register translator controller 100. Finally, at its contacts 183A, the relay R180A completes a circuit which may be traced from ground and then by way of the contacts 183A and 172A and the winding of the connect relay R250 in the register translator 200, to battery.

In response to the operation of relay R250, the register translator 200 is controlled to cause the ten thousand digit and the thousand digit to be registered in the register translator 200 and it completes marking circuits whereby the hundreds, tens and units marking relays in the register translator controller 100 are controlled and whereby these digits are simultaneously transferred from the register translator controller 100 to different registers included in the register translator 200.

Considering first the registration of the ten thousand and the thousand digits of the calling subscriber directory number in the register translator 200, which registration is controlled in accordance with the association of a line finder in a particular group of line finders with a particular register translator in one of the subgroups of register translators, it is noted that the register translator finder 205, in selecting the register translator 200 for use, at its wiper 296 engages a contact in the associated contact bank which is connected to terminal A of the register translator. The register translator accordingly is accessible to line finders serving subscriber lines whose ten thousand digit and thousand digit of the directory number are respectively the digits 5 and 7, or in other words, the fifty seven thousand group of subscriber lines, that is the subscriber lines having the directory numbers 57,000 to 57,999. The group of line finders serving the subscriber lines having the directory numbers 58,000 to 58,999 also have access to register translators, by way of their associated register translator finders to the terminal B. Finally, the group of line finders having access to subscriber lines have the directory numbers 59,000 to 59,999, also have access to register translators, by way of their associated register translator finders to the terminal C.

In the present example, when the connect relay R250 operates in the manner previously described, at its contacts 251 to 253, inclusive, it connects the three ten thousand and thousand registers R280, R270 and R260 by way of the conductors C286, C276 and C266 to the three terminals C, B and A. With the wiper 296 in engagement with the contact connected to terminal A, a circuit is completed for operating the relay R260 which circuit may be traced from ground and then by way of the contacts 555, the conductor C806, the wiper 296, the terminal A, the conductor C266, the contacts 253 and the lower winding of relay R260, to battery. The relay R260, upon operating, at its contacts 263, locks itself over a circuit including its upper winding to the grounded conductor C301. Also, at its contacts 261 and 263, it prepares circuits for marking the conductors C267 and C268 in accordance with the ten thousand digit and the thousand digit of the calling subscriber directory number. Finally, at its contacts 265, the relay R260 applies ground potential to the conductor C328 whereby a circuit will subsequently be completed for controlling the chain disconnect relay R395 in response to the registration in the register translator 200 of the hundreds, tens and units digits of the directory number of the calling subscriber line.

At its contacts 255, the relay R250 completes an obvious circuit for operating the connecting slave relay R310 which relay, upon operating, at its contacts 311 to 316, inclusive, prepares circuits over which the hundreds, tens and units digits of the calling subscriber directory number are transferred from the register translator controller 100 to the register translator 200.

Finally, at its contacts 254, the relay R250 now completes the circuits for controlling the hundreds, tens and units marking relays in the register translator controller 100 in accordance with the operated condition of the line finder 500 which is now in engagement with the calling subscriber line. The circuit for controlling the units marking relays may be traced from ground and then by way of the contacts 254, the wiper 295, the conductor C805, the contacts 553 and 512, the wiper 595, the positive conductor C404 of the calling subscriber line, the contacts 411, the conductor C400 which connected to the terminal T452, the conductor 9 in the cable 197 and the winding of the units marking relay U9, to battery. The units making relay U9 now operates to store the digit 9 of the units digit of the calling subscriber directory number. Simultaneously with the completion of the above-mentioned circuits for controlling the units marking relays, a multiple circuit is also completed for controlling the tens marking relays in the register translator controller 100 to store the tens digit of the calling subscriber directory number. This circuit may be traced from the grounded conductor C805 and then by way of the contacts 552', the vertical wiper 598 of the line finder 500, which is now in engagement with the tenth contact in the vertical bank, and then by way of the conductor 0 in the cable 198 to the tens marking relay T0 in the register translator controller 100. Inasmuch as the tens marking relays T1 to T0, inclusive, correspond precisely to the units marking relays U1 to U0, inclusive, the detail circuit wiring of the tens marking relays has been omitted. It should be understood, however, that the operation of the tens marking relay T0 stores in the register translator controller 100 the tens digit 0 of the calling subscriber directory number.

Simultaneously with the registration of the units digit 9 and the tens digit 0, the hundreds marking relays H1 to H0, inclusive, in the controller 100 are also operated to store the hundreds digit of the calling subscriber directory number. This circuit may be traced from the grounded conductor C805 in the line finder 500 and then by way of the contacts 551' and 511' to the conductor 1 in the cable 199A and then by way of the winding of the hundreds marking relay H1, to battery. The hundreds marking relay H1, upon operating, stores in the register translator controller 100, the hundreds digit 1 of the calling subscriber directory number.

By way of explanation of the manner in which the units, tens and hundreds digits of the calling subscriber directory number are registered, it is noted that the units digit marking conductor C408 may be connected to any one of the tens conductors 1 to 0, inclusive, in the cable 197 to operate the corresponding units marking relays regardless of the position of the calling subscriber line in the ten contacts in the selected level of the line finder 500. It also should be noted that the contact in the vertical level engaged by the vertical wiper 598 is connected to a corresponding one of the ten conductors 1 to 0, inclusive, in the cable 198. However, it should be understood that any one of the ten conductors could be connected to the tenth contact in the vertical level of the bank to store the corresponding digit in the tens marking relays. In other words, the vertical contact selected by the vertical wiper 598 does not necessarily correspond to the numerical value of the conductor in the cable 198 which is connected to the contact. With respect to the registration of the hundreds digit of the calling subscriber directory number, it is noted that the line finder 500 is illustrated to mark either the marking conductor 1 or the marking conductor 0 in the cable 199A depending upon which one of the switching relays R510 or R520 is operated to connect with the calling subscriber line. As previously noted, the switching relay R510 is operated when the finder finds the calling subscriber line terminals in the hundred subscriber lines accessible to the wipers 594 to 596, inclusive. On the other hand, the switching relay R520 operates when a calling subscriber line is found in the banks accessible to the wipers 591 to 593, inclusive. Accordingly, it will be understood that since the line finder 500 has access to two separate groups of 100 subscriber lines, at least two different hundreds digits must be selectively registered in the hundreds marking relays of the register translator controller 100. The group of finders having access to the two groups of 100 subscriber lines are all arranged to mark the same hundreds digits when the calling subscriber line in the two hundred group of subscriber lines is found. Therefore, in each 1000 group of subscriber lines the finders were divided into five groups of 200 lines each and each of the finders in the five groups is arranged at contacts corresponding to the contacts 511' and 521' to mark in the hundreds marking relays of the register translator controller 100 the hundreds digit corresponding to the directory number of the calling subscriber lines in the associated group of subscriber lines.

In view of the foregoing description of the mode of operating the register translator controller 100 it will be understood that the hundreds marking relay H1, the tens marking relay T0 and the units marking relay U9 in the register translator controller 100 are simultaneously operated to temporarily store therein the hundreds, tens and units digit "109" of the calling subscriber directory number. As each of the above-mentioned relays are operated, they immediately transfer to corresponding registers in the register translator 200 the stored digits of the calling subscriber directory number. Each of these digits are transferred over a pair of conductors to the register translator 200. More specifically, the units digit is transferred in code form over the conductors C195 and C196; the tens digit is transferred over the conductor C193 and C194; and the hundreds digit is transferred over the conductor C191 and C192. The three groups of ten relays which respectively store the hundreds, tens and units marking digits in the register translator controller 100 are arranged to register any one of the ten digits 1 to 0, inclusive, in each of the three registers in the register translator 200. Only six relays are provided in the units, tens and hundreds digit registers in the register translator 200 to register any digit from 1 to 0, inclusive.

The digits registered in response to the operation of the respective units marking relays and the ground potential of three different voltages applied to the conductors C195 and C196 is shown in the following table:

UNITS MARKING RELAYS

*Register translator controller 100*

| Registered digit | Relay operated | Grd applied to— | |
|---|---|---|---|
| | | C195 | C196 |
| 1 | U1 | Direct | None. |
| 2 | U2 | 2,000 ohms | 2,000 ohms. |
| 3 | U3 | 2,000 ohms | 500 ohms. |
| 4 | U4 | 500 ohms | 2,000 ohms. |
| 5 | U5 | 500 ohms | 500 ohms. |
| 6 | U6 | None | Direct. |
| 7 | U7 | 2,000 ohms | None. |
| 8 | U8 | 500 ohms | None. |
| 9 | U9 | None | 2,000 ohms. |
| 0 | U0 | None | 500 ohms. |

Referring now to the units digit register in the register translator 200 it will be seen that six relays are provided respectively designated R320 to R370, inclusive. The relays R320, R330 and R340 are controlled over the conductor C195 in accordance with the different ground potentials applied thereto by the units marking relays in the register translator controller 100. Also, the relays R350, R360 and R370 are controlled over the conductor C196 in accordance with the different ground potentials applied thereto by the units marking relays in the register translator controller 100. The units digit register relays are operated individually or in combinations to register the digits 1 to 0, inclusive, in accordance with the following table:

UNITS DIGIT REGISTER

*In register translator 200*

| Ground applied— | | Relays operated over— | | Relays locked operated | Digit registered |
|---|---|---|---|---|---|
| C195 | C196 | C195 | C196 | | |
| Direct | None | R320, R330, R340. | None | R340 | 1 |
| 2,000 ohms | 2,000 ohms | R320 | R350 | R320, R350 | 2 |
| 2,000 ohms | 500 ohms | R320 | R350, R360 | R320, R360 | 3 |
| 500 ohms | 2,000 ohms | R320, R330 | R350 | R330, R350 | 4 |
| 500 ohms | 500 ohms | R320, R330 | R350, R360 | R330, R360 | 5 |
| None | Direct | None | R350, R360, R370. | R370 | 6 |
| 2,000 ohms | None | R320 | None | R320 | 7 |
| 500 ohms | None | R320, R330 | None | R330 | 8 |
| None | 2,000 ohms | None | R350 | R350 | 9 |
| None | 500 ohms | None | R350, R360 | R360 | 0 |

In the present example, it is assumed that the units digit 9, is stored in the units digit marking relay U9, the tens digit 0 is stored in the tens digit marking relay T0 and the hundreds digit 1 is stored in the hundreds digit marking relay H1. Consequently, when the U9 relay operates, it closes its contacts U9A and completes a circuit from ground by way of the 2000 ohm resistor 107 and then by way of the contacts U9A, the conductor C196, the contacts 315 and the upper windings of relays R350, R360 and R370 in series, to battery. When this circuit is completed, the relay R350 operates and, at its contacts 351, locks itself in its operated position over a circuit including its lower winding, the contacts 351, 362 and 372 and the grounded conductor C301. It should be noted that the resistor 107 included in the above-traced circuit for the relays R350, R360 and R370 passes sufficient current to cause the operation of relay R350, but insufficient current flows to cause the operation of relays R360 and R370 and, consequently, the latter relays remain in their unoperated positions. It should also be noted that in the case of transferring the digit 9 by the operation of the units marking relay U9, no potential is applied to the conductor C195 and therefore, the relays R320, R330 and R340 in the units digit register of the register translator 200 remain in their restored positions. In view of the foregoing description of operation, it will be understood that the units digit 9 of the directory number of the calling subscriber line has now been registered in the register translator 200 by the operation of the relay R350.

Simultaneously with the transfer of the units digit 9 from the register translator controller 100 to the units digit register in the register translator 200, the tens digit 0 and the hundreds digit 1, are simultaneously transferred from the register translator controller 100 to the tens digit register and the hundreds digit register in the register translator 200 in accordance with the above tables.

As soon as the units digit register relay R350 operates, it closes its contacts 352 thereby to prepare a circuit for the chain disconnect relay R395. It may be well to mention at this time that the chain circuit for controlling the chain disconnect relay R395 includes a contact on each of the register relays in the units, tens and hundreds digit registers and the conductor C326. This chain circuit prevents the chain disconnect relay R395 from operating until at least one relay in each of the above-mentioned three registers has been operated to register a digit of the directory number of the calling subscriber line.

As soon as the digits have been registered in the three registers noted, the chain disconnect relay R395 is operated over a circuit which may be traced from ground at the contacts 265 of the operated relay R260 and then by way of the conductor C328, one or more of the operated register relays in the hundreds digit register, one or more of the operated register relays in the tens digit register, the contacts 352 of the operated register relay R350 in the units digit register, and the winding of the chain disconnect relay R395, to battery. The operation of the chain disconnect relay R395 indicates that the ten thousand and thousand digit of the calling subscriber directory number and the hundred, ten and unit digits of the calling subscriber directory number have been registered in the translator 200.

Since the calling subscriber number has now been registered in the register translator 200, the register translator controller 100 may be restored to normal and thus rendered available for determining the directory number of another calling subscriber line and the chain circuit for preventing other register translators from operating may be restored to normal. Accordingly, when the chain disconnect relay R395 operates, at its contacts 397, it completes a circuit for operating the translator connecting relay R540 in the line finder 500. This circuit may be traced from battery and then by way of the winding of the relay R540, the contacts 559, the conductor C810, the wiper 298, the contacts 397, the conductor C302, the contacts 223 and 211, to ground. Simultaneously with the operation of relay R540, the relay R395, at its contacts 398, applies ground potential to the conductor C304 thereby to operate the chain disconnect slave relay R170A, individual to the register translator 200, thereby to cause the restoration of the chain test relay R180A and the subsequent restoration of the chain equipment to render the remaining register translators available to receive the identity of the directory number of other calling subscribers.

Before describing the operation of the circuits in response to the opertation of the chain disconnect slave relay R170A, the circuit operations in the line finder 500 which result from the operation of the translator connecting relay R540 will be described.

Referring now to the line finder 500 it is noted that when the translator connecting relay R540 operates, at its contacts 544', it locks itself in its operated position over a circuit including the conductor C810 which circuit is independent of the initial operating circuit including the contacts 559. At its contacts 545', it applies ground potential to the conductor C745 thereby to operate the distributor disconnect relay R690 in the finder distributor 600. At its contacts 541 and 542, the relay R540 connects the impulsing conductors C801 and C802 from the register translator 200 to the conductors C811 and C812 extending to the selector individual to the line finder 500. At its contacts 544 and 546, the relay R540 prepares points in the circuits including conductors C803 and C804 over which the impulses of the called subscriber directory number are transmitted from the calling subscriber dial to the register translator 200. At its contacts 547, the relay R540 prepares a point in the circuit for controlling the switching relay R510, which circuit is effective after the distributor finder 600 is disconnected from the line finder 500. At its contacts 549, the relay R540 prepares a point in a locking circuit for the lower winding of relay R510; at its contacts 541′, it opens the locking circuit for the upper winding of the start relay R560 which now restores to normal; and, at its contacts 542′, it completes a circuit including the contacts 515 and 526 and the winding of the relay R530, for operating the latter relay. Finally, at its contacts 543′, the relay R540 applies an additional hold ground potential to the conductor C807 thereby to retain the seizure relay R220 operated in the register translator 200 after the test relay R550 in the line finder 500 restores to normal.

When the start relay R560 restores to normal in response to the operation of relay R540, at its contacts 563 and 564, it interrupts points in the previously described circuits for controlling the rotary magnet RM206 and the test relay R550. Finally, at its contacts 565, the relay R560 opens a point in the circuit of relay R720 in the finder distributor 600. The control relay R720, however, is retained in its operated position under control of the previously described circuit including the contacts 627 on the operated relay R620.

The test relay R550 in the line finder 500 restores to normal in response to the restoration of the start relay R560 and, at its contacts 551, 553, 551′ and 552′, interrupts the circuits for controlling the units, tens and hundreds marking relays in the register translator controller 100. Consequently, the relays in the register translator controller 100, which have been operated in accordance with the units, tens and hundreds digits of the calling subscriber directory number are restored to normal and are rendered available for use by other register translators to register the directory number of another calling subscriber line. At its contacts 552 and 554, the relay R550 prepares points in the locking circuits for the lower windings of either the switching relay R510 or the switching relay R520 depending upon which one of these two relays is operated at this time. At its contacts 555, it removes the ground potential from the conductor C806 and, at its contacts 559, it interrupts a point in the initial circuit for the translator connecting relay R540.

From the foregoing description of operation it will be understood that the chain disconnect relay R395, upon operating, indicates to the register translater 200 that the digits of the calling subscriber number have been registered therein and it controls the relay R540 in the line finder 500 in order to operate the switch-through relay R530 and the distributor disconnect relay R690 and to restore the test relay R550 and the start relay R560. The restoration of the translator control relay R540 also performs certain operations in the finder distributor 600 to render the finder distributor available for other calls. However, before describing the restoration of the finder distributor 600 the release of the group chain relays will be described.

It should be noted, however, that the group chain relays in their operated positions prevent other register translators from operating during the period of time that the register translator 200 is receiving and registering the calling subscriber directory number, which number has been determined in accordance with the operation of the register translator controller 100. At the time the calling subscriber number is completely registered in the register translator 200 the chain disconnect relay R395 operates as previously noted, and at its contacts 398, applies ground potential from the conductor C304, thereby to cause the operation of the chain disconnect slave relay R170A which is individual to the register translator 200.

When the chain disconnect slave relay R170A operates, it interrupts, at its contacts 171A, the series chain circuit including the windings of the chain test relay R180A and the group chain relay R120. It will be recalled that the chain test relay R180A, at its contacts 181A, prevents operation of any of the remaining chain test relays R180B to R180F, inclusive, in order to prevent the subgroup of translators, including the register translator 200, from being operated during the short interval of time that the calling subscriber directory number is being determined. The group chain relay R120, in its operated position disconnects the remaining three subgroups of register translators and thus prevents any of the latter register translators from being operated to register the identity of a calling subscriber directory number by interrupting the chain test circuit including respectively conductors C111 to C113, inclusive, for the remaining three subgroups of register translators. In view of the foregoing it will now be understood that the restoration of the chain test relay R180A and the group chain relay R120 places the register translator controller 100 in a position to be selectively used by any one of the remaining translators in any one of the four subgroups of register translators. As a further result of the operation of the chain disconnect slave relay R170A, at its contacts 172A, it interrupts the previously described circuit for the connect relay R250 in the register translator 200, which relay now restores to normal.

When the relay R250 restores, at its contacts 251 to 253, inclusive, it interrupts points in the circuits for the lower windings of the three register relays R260, R270 and R280. Since the register relay R260 is in its operated position at this time and since it is locked in its operated position, at its contacts 263, to the grounded conductor C301, it remains in its operated position when the initial energizing circuit is opened at the contacts 253. As a further result of the restoration of relay R250, at its contacts 254, it removes the operating ground potential from the conductor C805, but this removal of ground has no function to perform at this time inasmuch as the test relay R550 is now in its restored position. Finally, at its contacts 255, the relay R250 interrupts the circuit for the connecting slave relay R310 thereby to disconnect, at its contacts 311 to 316, inclusive, the circuits over which the hundreds, tens and units digits of the calling subscriber directory number are transferred from the marking relays in the register translator controller 100 to the corresponding digit registers in the register translator 200. The operated ones of the digit registers in the register translator 200 are retained in their operated positions over locking circuits including their lower windings and the grounded conductor C301.

The calling subscriber directory number is now completely registered in the register translator 200. Furthermore, the register translator controller 100 is now available for use by other register translators, and the line finder 500 is in condition to connect the calling subscriber line through to the register translator 200 thereby to permit the calling subscriber to register therein the digits corresponding to the directory number of a desired called subscriber.

Referring again to the operation of the translator connect relay R540, it will be recalled that, at its contacts 545', it applied ground potential to the conductor C745 extending to the finder distributor 600. The application of ground potential to the above-mentioned conductor completes a circuit by way of the wiper 735, the contacts 686 and the winding of the distributor disconnect relay R690 to battery. The relay R690 initiates operations whereby the finder distributor 600 is disconnected from the line finder 500 and is thus rendered available for use in other calls. More specifically, the relay R690, upon operating, at its contacts 691, opens another point in the initial operating circuit for the start relay R630; at its contacts 693, it disconnects the circuit including the high resistance upper winding of the test relay R710 from the conductor C744; and, at its contacts 692 it substitutes a direct ground potential on the conductor C744. This operation completes a circuit for now operating the marginal cut-off relay R410 which relay up until this time has been prevented from being operated due to the high resistance of the upper winding of relay R710. This circuit may be traced from ground and then by way of the contacts 712 and 692, the rectifier 638, the wiper 734, the conductor C744, the wiper 596, the conductor C405, the contacts 422 and 413, and the winding of relay R410, to battery. The relay R410 now operates and, at its contacts 411 and 412, disconnects the marking conductor C408 from the conductor C404 and connects the calling subscriber line conductor C402 to the conductor C404. As a further result of the operation of relay R410, at its contacts 413, it removes the short-circuit from the upper winding of relay R420 and thus completes a locking circuit for itself which includes the upper winding of the relay R420, the contacts 422 and the grounded conductor C405. At its contacts 414, the relay R410 connects the ground potential applied to the conductor C405 to the private conductor P extending to the connector banks in order to mark the calling subscriber line as busy. At its contacts 415 and 417, the relay R410 disconnects the lower winding of the line relay R420 from the calling subscriber line and, at its contacts 419, it opens the starting circuit for the start relay R605, which relay restores to normal, and it removes the marking potential from the conductor C406. In view of the above-described operation of the cut-off relay R410 under control of the finder distributor disconnect relay R690, the calling subscriber line will now be connected through to the register translator 200 and will receive the dial tone signal which indicates that the calling subscriber may now commence to dial the directory number of a desired called subscriber.

Referring again to the distributor disconnect relay R690, it will be noted that, at its contacts 697, it short-circuits the lower winding of the relay R620 which relay now restores to normal. The relay R620 restores to normal shortly after the contacts 697 are closed and, at its contacts 621 and 622, it disconnects the upper and lower windings of the start relay R630 from the locking circuits including ground potential at contacts 696 and 607. Consequently, the start relay R630 now slowly restores to normal. It should be noted, however, that if the start relay R605 is released before the relay R620 restores to normal, the start relay R630 will be in its restored position at the time the relay R620 is released. At its contacts 623, the relay R620 prepares a point in the circuit for the rotary magnet RM615; at its contacts 625, it opens the locking circuit for the relays R640 and R660 which relays will now restore to normal. At its contacts 627, the relay R620 now opens the circuit for the relay R720 which relay restores to normal. Referring now to the relay R720 it will be noted that when it is restored to normal, at its contacts 722 it interrupts the locking circuits for the lower windings of relay R680 and the test relay R710 which relays now restore to normal. The restoration of the relay R680, at its contacts 685, interrupts the previously traced circuit for the distributor disconnect relay R690 thus causing the latter relay to restore, and thus renders the finder distributor 600 available for use in other calls.

Returning again to the line finder 500, it will be noted that when the switch-through relay R530 operated as previously described, it closed its various contacts to connect the calling subscriber line conductors C401 and C402 by way of the wipers 594 and 595, the contacts 511 and 512, 534 and 535, 544 and 546, the conductors C803 and C804, the wipers 293 and 294, the lower windings of relays R230 and R235 to ground and battery, respectively. This loop circuit including the calling subscriber substation and the line relays R230 and R235 in the register translator 200 cannot be completed until the cut-off relay R410 in the subscriber line circuit 400 is operated under control of the contacts 692 of the distributor disconnect relay R690 as previously described. Also, the loop circuit cannot be completed until the switch-through relay R530 is operated under control of the translator connect relay R540 in the line finder 500. Accordingly, the dial tone signal connected to the upper windings of the line relays R230 and R235 will not be transmitted to the calling subscriber substation until the above-mentioned loop circuit has been completed. As a further result of the operation of the relay R530, at its contacts 536, it extends the ground potential at the contacts 547, by way of the upper winding of relay R510, the contacts 513, the wiper 596, the conductor C405, the contacts 422, the upper winding of the line relay R420 and the winding of the cut-off relay R410, to battery. This circuit is completed to hold the switch relay R510 in its operated position over its upper winding as soon as the distributor disconnect relay R690 restores to normal and removes the direct ground potential from the conductor C744. When this occurs, the switch relay R510 is held in its operated position over a circuit including its upper winding, the upper winding of relay R420 and the winding of relay R410 thereby to maintain the said relays in their operated position as long as the connection is retained by the calling subscriber.

When the calling subscriber at substantion A hears the dial tone signal, the calling device may be actuated in accordance with the digits of the called subscriber directory number. The line relays R230 and R235 in the register translator 200 respond in the well-known manner to the impulses of the called subscriber directory number and these digits are registered in the register translator 200 in substantially the same manner as is described and shown in the Ostline Patent No. 2,369,071 granted February 6, 1945. In general, the operation of the register translator shown in the above-mentioned Ostline patent is the same as the register translator 200 in that it registers the number of the called subscriber substation and transmits the necessary impulses in numerical form to set up a connection to the desired called subscriber. Furthermore, the register translator operates to transmit code impulses to a subsequent switching stage as is disclosed in the Ostline patent in order to register certain items of information pertaining to the telephone connection, including the digits of the directory number of the calling subscriber substation. The items of information which are transmitted in code form to the subsequent switching stage may be stored until the telephone connection is released and then transmitted to a record producing mechanism which will produce a record of the items of information pertaining to the telephone connection including the directory number of the calling subscriber substation.

Referring to the register translator 200 it may be well to mention that the impulses transmitted therefrom for setting up the telephone connection are transmitted over the wipers 291 and 292, the conductors C801 and C802, the contacts 541 and 542, and the conductors C811 and C812 extending to the next switching stage, which, in the present example, would be the selector (not shown) associated with the line finder 500. In addition to transmitting the switch setting impulses over the above-traced path, the register translator 200 also transmits, in the proper sequence, the code impulses corresponding to the various items of information pertaining to the telephone connection including the directory number of the calling subscriber line. In order to illustrate the manner in which the register translator 200 determines the digits of the calling subscriber directory number as registered therein, the sequence switch RS6X has been schematically illustrated and it is noted that this sequence switch corresponds to the sequence switch RS6 shown in the register translator of the above-mentioned Ostline patent. When the register translator of the Ostline patent has performed the various operations to complete the connection to a desired called subscriber and has reached a point in the transmission of code impulses for recording purposes, where it is in a position to begin the transmission of code impulses corresponding to the digits of the calling subscriber directory number, the wiper 300X of the sequence switch RS6X will be in engagement with the contact in its associated bank terminating the conductor 318X. When this point is reached, a ground potential is extended by way of the wiper 300X, the conductor 318X, the contacts 261 and the conductor C267. The conductor C267 is connected to the terminal 5 on the terminal strip TS289 thereby to mark the conductor 5 in the cable 282 in accordance with the ten thousands digit 5 of the calling subscriber directory number. It should be understood that the ten conductors 1 to 0, inclusive, in the cable 282 are connected to a code and numerical pulse transmitter (not shown) in the register translator 200, which transmitter corresponds to the one disclosed in the above-mentioned Ostline patent. When the conductor C267 is grounded, in the manner described above, the code and numerical pulse transmitter in the register translator 200 transmits, over the wipers 291 and 292 to a subsequent switching stage, code pulses corresponding to the ten thousands digit 5 of the calling subscriber directory number. When this digit has been transmitted, the wiper 300X of the sequence switch RS6X is advanced one step to engage the contact terminating the conductor 319X. Accordingly, the marking ground potential applied to the conductor C267 is removed therefrom and is now applied by way of the contacts 262 and the conductor C268 to the terminal 7 on the terminal strip TS289 and thus marks the conductor 7 in the cable 282 in accordance with the thousands digit 7 of the calling subscriber directory number. The code and numerical pulse transmitter (not shown) now transmits in code form the thousands digit 7 of the calling subscriber directory number to the subsequent switching stage in the manner described above.

After the thousands digit 7 has been transferred from the register translator 200 to the subsequent switching stage, the sequence switch RS6X advances its wipers 300X into engagement with the contact terminating the conductor 320X whereby a circuit is completed for operating the relay R380H. The relay R380H, upon operating, at its contacts 381H to 390H, inclusive, connects the ten marking conductors 1 to 0, inclusive, in the cable 282 to the various contacts of the operated register relays in the hundreds digit register. It may be well to point out at this time that the hundreds digit register and the tens digit register in the register translator 200 are wired and connected in exactly the same manner as the units digit register, the details of the units digit register having been disclosed to illustrate the circuit arrangement. In the present example, the hundreds digit register has been operated to register the hundreds digit 1 of the calling subscriber directory number and it should be understood that the conductor 1 in the cable 282 will therefore be marked in accordance with the digit 1. The code and numerical pulse transmitter now operates to transmit in code form over the wipers 291 and 292, the digit 1 corresponding to the hundreds digit of the calling subscriber directory number. When this operation is complete, the sequence switch RS6X advances its wiper R300X into engagement with the contact terminating the conductor 321X whereupon the relay R380H restores to normal and the relay R380T operates. The relay R380T, upon operating, at its contacts 381T to 390T, inclusive, connects the ten marking conductors 1 to 0, inclusive, of the cable 282 to the contacts of the operated register relays in the tens digit register. In the present example, the tens digit register has been operated to register the tens digit 0 of the calling subscriber directory number and this digit is transmitted in code form in the manner previously described to the subsequent switching stage for record purposes.

The wiper 300X of the sequence switch RS6X is now advanced into engagement with the contact terminating the conductor 322X whereupon the relay R380T restores to normal and the relay R380U operates. The relay R380U, upon operating, at its contacts 381U to 390U, inclusive, connects the ten marking conductors 1 to 0, inclusive, in the cable 282 to the contacts of the register relays in the units digit register. In the present example, the units digit register has been operated to register the units digit 9. In accordance with the table shown above, the units digits register relay R350 is operated to register the units digit 9 of the calling subscriber directory number and, at its contacts 357, it connects ground potential by way of the contacts 326, 337, and 389U, to mark the conductor 9 in accordance with the registered units digit 9. The code and numerical pulse transmitter now operates in the manner previously indicated to transmit over the wipers 291 and 292 code pulses corresponding to the units digit 9 to a subsequent switching stage for the purposes of producing a record.

The wiper 300X of the sequence switch RS6X is now advanced into engagement with the contact terminating the conductor 317X thereby to complete a circuit for operating the translator release relay R210 over a circuit including its lower winding. The operation of the translator release relay R210 initiates operations in the register translator 200 whereby the register translator is automatically restored to normal. Furthermore, during the releasing operation of the register translator, the relay R240 is operated and, at its contacts 241, completes a circuit for the upper winding of the translator release relay R210. When the relay R210 operates, at its contacts 212, it completes an alternate locking circuit, including the contacts 224, for its upper winding thereby to retain the relay R210 in its operated position in the event the seizure relay R220 fails to subsequently release. Also, at its contacts 213 to 216, inclusive, the relay R210 disconnects the conductors C801 and C802 from the register translator pulse transmitter and connects these conductors to a loop circuit including the resistor 216′ thereby to retain the selector portion of the link including the line finder 500 and the subsequent switches in their operated positions during the releasing operation of the register translator 200. As a further result of the operation of relay R210, at its contacts 211, it interrupts the previously described circuit of the translator connect relay R540 in the line finder 500. The relay R540 now restores to normal and, at its contacts 543′, removes ground potential from the conductor C807 thereby to interrupt the circuit of the seizure relay R220 in the register translator 200. The seizure relay R220 now slowly restores to normal and upon restoring, interrupts, at its contacts 222, the previously described dial tone circuit for the upper windings of relays R230 and R235. However, it should be understood that the dial tone signal applied to the conductor C256 was disconnected from this conductor as soon as the calling subscriber dialed the first digit of a desired called subscriber number into the register translator 200. Also, at its contacts 221, the relay R220, upon restoring, interrupts the circuit for the seizure slave relay R160A which relay now restores to normal and, at its contacts 161A opens an additional point in the circuit of the chain test relay R180A. At the contacts 223, the relay R220 interrupts a further point in the circuit of relay R540; at its contacts 224, it interrupts the alternate holding circuit for the upper winding of relay R210; and, at its contacts 225, it removes ground potential from the hold conductor C301.

As soon as ground potential is removed from the conductor C301, the various operated register relays in the hundreds, tens and units digit registers now restore to normal and the operated ten thousand and thousand register relays R260 restore to normal. Incident to the restoration of the register relays, the previously described chain circuit for operating the chain disconnect relay R395 is interrupted and the relay R395 restores to normal. At its contacts 398, the relay R395 interrupts the circuit of the chain disconnect slave relay R170A, which relay, upon restoring, again completes the chain circuit whereby the register translator 200 can again be selected for use in another call. During the time that the apparatus (not shown) in the register translator 200 is restored to normal, the wiper 300X of the sequence switch RS6X is advanced to its normal resting position to condition the register translator 200 for subsequent operation and also to remove ground potential from the conductor 317X. As soon as the register translator 200 has fully restored to normal and is again available for use, the relay R240 is restored to normal and interrupts, at its contacts 241, the final holding circuit for the upper winding of the translator release relay R210. The translator release relay R210 now restores to normal and renders the register translator 200 available for additional calls.

In the foregoing description of the release of the register translator 200, it was pointed out that the translator connect relay R540 in the line finder 500 restored to normal. Referring to the relay R540, it will be seen that, at its contacts 541, 542, 544 and 546, it disconnects the conductors C801 to C804, inclusive, and, at its contacts 543 and 545 it connects the calling subscriber line conductors C401 and C402 to the conductors C811 and C812 extending to the selector (not shown). In this manner, the calling subscriber line is extended through the line circuit 400 and the line finder 500 to the subsequent switches in the switch train to the desired called subscriber line, so that the subscribers involved in the connection may now converse. Also, upon the restoration of the relay R540, at its contacts 547, it opens a point in the circuit for applying ground potential to the conductor C813, but this is without effect at this time since the subsequent switch train including the selector (not shown) returns ground potential over the conductor C813, in accordance with conventional practice, in order to retain the line finder 500 and the line circuit 400 in their operated positions. The contacts 548 and 549 interrupt points in the circuit including the conductor C805 and C806, and the contacts 543′ remove the busy marking potential from the conductor C807 thereby to permit the register translator 200 to be seized by another register translator finder.

In view of the foregoing description of the mode of operation of the apparatus disclosed, it will be understood that the register translator 200, the register translator controller 100, and the finder distributor 600 have now been restored to normal and are available for additional calls. It will be also understood that the line circuit 400, the line finder 500 and the subsequent switches are utilized in the established telephone connection in the conventional manner and when the calling and the called subscribers have terminated the telephone conversation and replaced their receivers on the switchhooks of their associated substation instruments, the various units of equipment including the line circuit 400, the line finder 500 and the subsequent switching apparatus are automatically restored to normal. It should be noted, however, that a record is made of the various items of information pertaining to the telephone connection in the manner disclosed in the previously mentioned Ostline patent.

Incident to the release of the connection by the calling and called subscribers, ground potential is removed from the conductor C813 thereby to interrupt the circuit including the upper winding of the relay R510, the upper winding of the relay R420 and the winding of the relay R410. These relays now restore to normal. The restoration of the relay R510 interrupts, at its contacts 515, the locking circuit for the switch-through relay R530, which relay now restores to normal. As a further result of the restoration of relay R510, it completes, at its contacts 515', a circuit including the contacts 525', the contacts VON581 for operating the release magnet RLS578. The release magnet, upon operating, causes the wipers 591 to 598, inclusive, of the line finder 500 to be restored to normal in a conventional manner. Upon restoring, the various rotary off-normal contacts and vertical off-normal contacts are moved to the positions illustrated in the drawings in order to restore the line finder 500 to its normal resting position. Incident to the restoration of the wipers, the VON contacts 581 are opened thereby to interrupt the circuit of the release magnet RLS578 which magnet now restores to its normal unoperated position. The line finder 500 is thereby rendered available for use in other calls. The restoration of the cut-off relay R410 and the line relay R420 in the line circuit 400 conditions the subscriber line to be used in additional calls and also to remove the busy marking potential from the private conductor P terminating in the banks of connectors having access to the station A.

During the foregoing description of the operation of the system it was assumed that the calling subscriber line terminated in the line finder bank contacts accessible to the wipers 594 to 596, inclusive, and accordingly the switching relay R510 was utilized to complete the telephone connection. If the subscriber line terminated in the set of bank contacts accessible to the wipers 591 to 593, inclusive, the switching relay R520 would have been utilized in establishing the telephone connection. The principal difference between the two switching relays R510 and R520 is that the relay R510 has access to calling subscriber lines in the hundreds group of subscriber lines having the hundreds digit 1, whereas the switch relay R520 has access to calling subscriber lines in the second hundred group of lines having the hundreds digit 0. Thus, it will be seen that when the switching relay R520 is operated, the register translator controller 100 is controlled at the contacts 521' to store the hundreds digit 0 instead of the hundreds digit 1. In other respects the line finder 500 operates in substantially the same manner when the calling subscriber line is found in the set of bank contacts accessible to the wipers 591 to 593, inclusive, as it does when the calling subscriber line is found in the set of bank contacts accessible to the wipers 594 to 596, inclusive.

While one embodiment of the invention has been described, it will be understood that various modifications may be made therein without departing from the true spirit and scope of the invention.

What is claimed is:

1. In a telephone system, a line having a multi-symbol designation, a line finder having access to said line, a finder distributor, a register including a plurality of individual register units operative to indicate said designation, a register controller, relay means operated responsive to a call on said line for associating said distributor with said line finder and for controlling said finder to connect with said calling line, relay means operated responsive to said connection for associating said line finder with said register, a source of potential, relay means operated responsive to said last-mentioned association for connecting said source of potential by way of said line finder to operate said register controller to store therein said calling line multi-symbol designation, and means controlled in response to said operation of said register controller for operating said individual register units of said register to indicate the individual symbols of said line designation.

2. In a telephone system, a line having an individual line number, a switch, a distributor, relay means operated responsive to a call on said line for associating said distributor with said switch, means in said distributor for operating said switch to search for said calling line and for terminating said searching operation when said line is found, a register including a plurality of individual register units operative to indicate said line number, a source of potential, relay means operated responsive to said switch finding said line for associating said register with said switch and for connecting said potential to said switch, and relay means operated responsive to said connection of said potential to said switch for operating said individual register units of said register to indicate said individual line number.

3. In a telephone system, a line having an individual plural-digit designation, a line finder, relay means operated responsive to a call on said line for controlling said finder to find said line, a storage device, a source of potential, relay means operated responsive to said line finder finding said calling line for connecting said source of potential to said storage device in order to operate said storage device to store simultaneously the individual digits of said plural-digit designation, a register including a plurality of individual register units, and means operated in accordance with said plural-digit designation stored in said storage device for registering simultaneously the individual digits of said plural-digit designation in said individual register units of said register.

4. In a telephone system, a line having an individual plural-digit designation, a line finder, relay means operated responsive to a call on said line for controlling said finder to find said line, a storage device, a source of potential, relay means operated responsive to said line finder finding said calling line for connecting said source of potential to said storage device in order to operate said storage device to store simultaneously the individual digits of said plural-digit designation, a register translator including a plurality of individual register units, relay means operated in accordance with said plural-digit designation stored in said storage device for registering said plural-digit designation in said individual register units of said register translator, and means operated only in the event all of said digits of said plural-digit designation are registered in said individual register units of said register translator for releasing said storage device.

5. In a telephone system, a line having an individual plural-digit line number, a hunting switch having access to said line, a control unit, relay means operated responsive to a call on said line for associating said control unit with said switch, relay means operated responsive to said association for controlling said switch to hunt for said line, relay means in said control unit operated in response to said switch finding said line for terminating said hunting operation, a register including a plurality of individual register units operative to register said line number, a source of potential, relay means controlled in response to the termination of said hunt operation for associating said register with said switch and for connecting said potential to said switch, and means operated by said potential in accordance with the operated condition of said switch at the time said register is associated therewith for operating said individual register units of said register to register therein simultaneously the individual digits of said individual line number.

6. In a telephone system, a line having an individual plural-digit line number, a hunting switch having access to said line, a distributor, relay means operated responsive to a call on said line for associating said distributor with said switch and for marking said line as a calling line, relay means operated responsive to said association for initiating the operation of said switch to hunt for said marked calling line, relay means in said distributor controlled responsive to said switch finding said marked calling line for terminating the hunting operation of said switch, a register, a source of potential, relay means in said switch controlled responsive to said termination of said hunting operation for connecting said switch to said register, a register controller, relay means in said register operated responsive to said connection to connect said source of potential to said switch for selectively operating said register controller in accordance with the position of said switch at the termination of said hunting operation, and individual register units in said register selectively operated in accordance with said selective operation of said register controller for registering simultaneously the individual digits of said individual line number.

7. In a telephone system, a line having an individual plural-digit line number, a hunting switch having access to said line, a distributor, relay means operated responsive to a call on said line for associating said distributor with said switch and for marking said line as a calling line, relay means operated responsive to said association for initiating the operation of said switch to hunt for said marked calling line, relay means in said distributor controlled responsive to said switch finding said marked calling line for terminating the hunting operation of said switch, a register, a source of potential, relay means in said switch controlled responsive to said termination of said hunting operation for connecting said switch to said register, a register controller, relay means in said register operated responsive to said connection to connect said source of potential to said switch for selectively operating said register controller in accordance with the position of said switch at said termination of said hunting operation, individual register units in said register selectively operated in accordance with said selective operation of said register controller for registering simultaneously the individual digits of said individual line number, and means individual to said calling line for connecting said calling line to said register responsive to the registration therein of said individual line number.

8. In a telephone system, a line having an individual plural-digit line number, a hunting switch having access to said line, a control unit, relay means operated responsive to a call on said line for associating said control unit with said switch, relay means operated responsive to said association for controlling said switch to hunt for said line, relay means in said control unit operated in response to said switch finding said line for terminating said hunting operation, a register including a plurality of individual register units operative to register said line number, a source of potential, relay means controlled in response to the termination of said hunt operation for associating said register with said switch and for connecting said potential to said switch, means operated by said potential in accordance with the operated condition of said switch at the time said register is associated therewith for operating said individual register units of said register to register therein simultaneously the individual digits of said individual line number, and relay means in said register operated in response to said registration in said individual register units of said individual line number for disconnecting said operating means for said individual register units from said register.

9. In a telephone system, a line having an individual plural-digit line number, a hunting switch having access to said line, a control unit, relay means operated responsive to a call on said line for associating said control unit with said switch, relay means operated responsive to said association for controlling said switch to hunt for said line, relay means in said control unit operated in response to said switch finding said line for terminating said hunting operation, a register including a plurality of individual register units operative to register said line number, a source of potential, relay means controlled in response to the termination of said hunt operation for associating said register with said switch and for connecting said potential to said switch, means operated by said potential in accordance with the operated condition of said switch at the time said register is associated therewith for operating said individual register units of said register to register therein simultaneously the individual digits of said individual line number, and relay means in said register operated in response to said registration in said individual register units of said individual line number for controlling said switch to connect said calling line to said register.

10. In a telephone system, a line having an individual plural-digit designation, a line finder, relay means operated responsive to a call on said line for controlling said finder to find said line, a storage device, a plurality of groups of storage relays in said storage device, a source of potential, relay means operated responsive to said line finder finding said calling line for connecting said source of potential to each one of said groups of storage relays simultaneously in accordance with a different one of the digits of said plural-digits designation in order to store simultaneously the individual digits of said plural-digit designation in said storage device, a register translator, a plurality of groups of register relays in said register translator, and means controlled by said groups of storage relays for operating at least one relay in each of said groups of relay relays simultaneously in accordance with a digit of said plural-digit designation stored in said storage device in order to register simultaneously all of the digits of said plural-digit designation in said register translator.

11. In a telephone system, a line having an individual plural-digit designation, a line finder, relay means operated responsive to a call on said line for controlling said finder to find said line, a storage device, a plurality of groups of storage relays in said storage device, a source of potential, relay means operated responsive to said line finder finding said calling line for connecting said source of potential to each one of said groups of storage relays simultaneously in accordance with a different one of the digits of said plural-digit designation in order to store simultaneously the individual digits of said plural-digit designation in said storage device, a register translator, a plurality of groups of register relays in said register translator, connecting means in said register translator for associating said groups of register relays with corresponding groups of said storage relays, and means controlled by said groups of storage relays for transferring said plural-digit designation from said storage device to said associated groups of register relays in said register translator.

12. In a telephone system, a line, a station on said line having an individual multi-digit number, a finder having access to said line, relay means operated responsive to the initiation of a call at said station for marking said line and for causing said finder to find and connect with said marked line, a plurality of groups of marking conductors, a source of marking potential, a register mechanism including a plurality of groups of individual register units, relay means controlled responsive to said connection of said finder with said marked line for applying said source of marking potential simultaneously to a conductor in each of said groups of marking conductors, and means controlled over said marking conductors by said marking potential for registering simultaneously the individual digits on said multi-digit station number in each of said groups of individual register units of said register mechanism.

13. In a telephone system, a line, a station on said line having an individual multi-digit number, a finder having access to said line, relay means operated responsive to the initiation of a call at said station for marking said line and for causing said finder to find and connect with said marked line, a plurality of groups of marking conductors, a source of marking potential, a register mechanism, relay means controlled responsive to said connection of said finder with said marked line for applying said source of marking potential simultaneously to a conductor in each of said groups of marking conductors, means controlled over said marking conductors by said marking potential for registering simultaneously the individual digits of said multi-digit station number in said register mechanism, and relay means in said register mechanism operated in response to the registration of said station number for removing said source of marking potential from said marking conductors and for connecting said station to said mechanism by way of said line and said finder.

14. In a telephone system, a line, a station on said line having an individual multi-digit number, a finder having access to said line, relay means operated responsive to the initiation of a call at said station for marking said line and for causing said finder to find and connect with said marked line, a plurality of groups of marking conductors, a source of potential, a like plurality of groups of marking relays, a register mechanism having a corresponding plurality of groups of register relays, a pair of control conductors for each of said groups of register relays, relay means controlled responsive to said connection of said finder to said marked line for applying said source of potential to a marking conductor in each of said groups of said marking conductors in order to operate a marking relay in each of said groups of marking relays, and means controlled by each of said operated marking relays for marking at least one conductor of a corresponding pair of said control conductors in order to operate at least one register relay in a corresponding group of said register relays to register said multi-digit station number in said register mechanism.

15. In a telephone system, a group of lines, each of said lines having an individual multi-digit designation, a finder switch having access to said lines, relay means operated responsive to a call on any one of said lines for selecting said finder and for operating said finder to find and connect with said one calling line, a plurality of groups of marking conductors, a source of marking potential, a marking relay connected to each of said marking conductors, relay means operated responsive to said finder finding said calling line for applying said source of marking potential by way of separate circuit paths in said finder to a conductor in each of said groups of marking conductors in order to operate corresponding marking relays, a like plurality of groups of register relays, a plurality of pairs of control conductors, one pair of control conductors for each of said groups of register relays, means controlled by each operated marking relay for marking one or more of the conductors of a corresponding pair of said control conductors in order to operate one or more of the register relays in the corresponding group of said register relays, and means controlled by said operated register relays in said groups of registers for registering said calling line multi-digit designation.

16. In a telephone system, a group of lines, each of said lines having an individual multi-digit designation, a finder switch having access to said lines, relay means operated responsive to a call on any one of said lines for selecting said finder and for operating said finder to find and connect with said one calling line, a plurality of groups of marking conductors, a source of marking potential, a marking relay connected to each of said marking conductors, means operated responsive to said finder finding said calling line for applying said source of marking potential by way of separate circuit paths in said finder to a conductor in each of said groups of marking conductors in order to operate corresponding marking relays, a like plurality of groups of register relays, a plurality of pairs of control conductors, one pair of control conductors for each of said groups of register relays, means controlled by each operated marking relay for marking one or more of the conductors of a corresponding pair of said control conductors in order to operate one or more of the register relays in the corresponding group of said register relays, and means for locking operated one or more of said operated register relays in each of said groups of registers in order to register the digits corresponding to said calling line multi-digit designation.

17. In a telephone system, a group of lines, each of said lines having an individual multi-digit designation, a finder switch having access to said lines, a plurality of wipers and relays for said switch, relay means operated responsive to a call on any one of said lines for controlling said finder switch wipers to search for said one calling line and for terminating said searching operation when said calling line is found, a plurality of groups of marking conductors, means controlled responsive to the termination of said searching operation for completing a circuit to mark a conductor in one of said groups over one of said wipers and said calling line and for completing a circuit for marking a conductor in another of said groups over another of said wipers and for completing a circuit for marking a conductor in still another of said groups over certain of said relays, a register translator, and means controlled over said circuits for operating said register translator to register simultaneously the individual digits of said calling line multi-digit designation.

18. In a telephone system, a group of lines, each of said lines having an individual multi-digit designation, a finder switch having a plurality of wipers and a switching relay, relay means operated responsive to a call on any one of said lines for controlling said finder switch wipers to search for said one calling line and for terminating said searching operation when said calling line is found, a plurality of marking conductors, means controlled responsive to the termination of said searching operation for completing a circuit over one of said finder switch wipers and said calling line to operate a marking relay in one of said groups and for completing a circuit over another of said finder switch wipers to operate a marking relay in another of said groups and for completing a circuit over said finder switching relay to operate a marking relay in still another of said groups, a register translator having a plurality of groups of register relays, and means controlled by said operated marking relays for operating register relays in corresponding groups of register relays simultaneously in order to register simultaneously therein the digits corresponding to said calling line multi-digit designation.

19. In a telephone system, a group of lines, each of said lines having an individual multi-digit designation, a finder switch having access to said lines, relay means operated responsive to a call on any one of said lines for selecting said finder and for operating said finder to find and connect with said one calling line, a plurality of groups of marking relays for storing the digits of a calling line multi-digit designation, each of said groups of marking relays having a predetermined number of relays, a corresponding plurality of groups of register relays for registering the digits of a calling line multi-digit designation, each of said groups of said register relays having a predetermined lesser number of relays than each of the corresponding groups of marking relays, a pair of control conductors for each group of register relays, relay means operated responsive to said finder switch finding said one calling line for operating a marking relay in each of said groups of marking relays to store said calling line multi-digit designation, means providing a plurality of different voltages, and means controlled by said operated marking relays for applying said different voltages to said control conductors in order to operate said register relays in the corresponding groups of register relays individually or in combinations to register therein the digits of said calling line multi-digit designation stored in the corresponding groups of said marking relays.

20. In a telephone system, a group of lines, each of said lines having an individual multi-digit number, a plurality of finders, each of said finders having access to said groups of lines, relay means operated responsive to a call on any one of said lines for selecting an idle one of said finders and for operating said selected finder to find and connect with said one calling line, a plurality of registers, relay means controlled responsive to said selected finder finding said one calling line for selecting an idle one of said registers and for connecting said selected register to said finder, a control unit common to said lines and to said finders and to said registers, a source of potential, means in said selected register for connecting said source of potential by way of separate circuit paths in said selected finder to selectively operate said control unit to store therein the individual multi-digit number of said one calling line, and means controlled in accordance with said selective operation of said control unit for selectively operating said selected register to register therein said calling line multi-digit number.

21. In a telephone system, a group of lines, each of said lines having an individual multi-digit number, a plurality of finders, each of said finders having access to said groups of lines, relay means operated responsive to a call on any one of said lines for selecting an idle one of said finders and for operating said selected finder to find and connect with said one calling line, a plurality of registers, relay means controlled responsive to said selected finder finding said one calling line for selecting an idle one of said registers and for connecting said selected register to said finder, a control unit common to said lines and to said finders and to said registers, a source of potential, means in said selected register connecting said source of potential by way of separate circuit paths in said selected finder to selectively operate said control unit to store therein the individual multi-digit number of said one calling line, means controlled in accordance with said selective operation of said control unit for selectively operating said selected register to register therein said calling line multi-digit number, and means controlled responsive to the selective operation of said register for releasing said control unit in order to render the same available for use by other of said lines and said finders and said registers.

22. In a telephone system, a line having an individual pural-digit designation, a line finder, relay means operated responsive to a call on said line for controlling said finder to find said line, a storage device, a plurality of groups of storage relays in said storage device, a source of potential, relay means operated responsive to said line finder finding said calling line for connecting said source of potential to each one of said groups of storage relays simultaneously in accordance with a different one of the digits of said plural-digit designation in order to store simultaneously the individual digits of said plural-digit designation in said storage device, a register translator, a plurality of groups of register relays in said register translator, connecting means in said register translator for associating said groups of register relays with corresponding groups of said storage relays, means controlled by said groups of storage relays for transferring said plural-digit designation from said groups of storage relays in said storage device to said groups of register relays in said register translator, a chain circuit including each of said groups of register relays, means controlled by said groups of register relays in response to the transfer of all of the digits of said plural-digit designation for controlling said chain circuit, and means controlled in response to said control of said chain circuit for controlling said connecting means to disconnect said groups of register relays from said groups of storage relays.

23. In a telephone system, a group of lines, each of said lines having an individual multi-digit designation, a group of line finders, each of said finders having access to said lines, a relay distributor common to said finders, means operated responsive to a call on any one of said lines for controlling said distributor to select an idle one of said finders and to operate said selected finder to find and connect with said one calling line, a group of registers, a register finder individual to each of said finders, means controlled in response to said connection for controlling said register finder individual to said selected finder to find and select an idle one of said registers, a storage device common to said lines and said line finders and said registers, a chain control device common to said groups of registers, relay means controlled responsive to the selection of said one register for controlling said chain control device to temporarily place said storage device under the exclusive control of said one register, a source of potential, means in said one register for connecting said source of potential by way of said selected line finder to selectively operate said storage device to store said calling line multi-digit designation, means operated in response to said operation of said storage device for registering said stored designation in said one register, and means in said register controlled responsive to the registration therein of said calling line multi-digit designation for controlling said chain control device to render said storage device available to the remaining registers in said group.

24. In a telephone system, a group of lines, each of said lines having an individual multi-digit designation, a group of line finders, each of said finders having access to said lines, a distributor common to said finders, relay means operated responsive to a call on any one of said lines for controlling said distributor to select an idle one of said finders and to operate said selected finder to find and connect with said one calling line, a group of registers, a register finder individual to each of said finders, means controlled in response to said connection for controlling said register finder individual to said selected finder to find and select an idle one of said registers, a storage device common to said lines and said line finders and said registers, a chain control device common to said groups of registers, relay means controlled responsive to the selection of said one register for controlling said chain control device to temporarily place said storage device under the exclusive control of said one register, a source of potential, means in said one register connecting said source of potential by way of said selected line finder to selectively operate said storage device to store said calling line multi-digit designation, means operated in response to said operation of said storage device for registering said stored designation in said one register, means in said register controlled responsive to the registration therein of said calling line multi-digit designation for controlling said chain control device to render said storage device available to the remaining registers in said group, and means in said register also controlled responsive to the registration therein of said calling line multi-digit designation for controlling said distributor to render the remaining idle line finders in said group selectable by said distributor in response to a call on another one of said lines.

25. A registration system comprising a group of register relays divided into two subgroups, each relay having an energizing winding and a locking winding, a control conductor for each of said subgroups, means providing a plurality of different potentials, control means for applying said different potentials to either one or both of said control conductors to energize one of said relays in one or both of said subgroups of said register relays by way of the energizing windings, means including said locking windings of said energized relays for preventing more than one of said energized register relays in either of said subgroups from locking in its energized position in response to disconnection of said control means from said control conductors, marking conductors, and means controlled by said locked register relay or relays for marking said marking conductors.

26. A registration system comprising a group of register relays divided into two subgroups, each relay having an energizing winding and a locking winding, a control conductor for each of said subgroups, means providing a plurality of different potentials, control means for applying said different potentials to either one or both of said control conductors to energize one or more of said relays in one or both of said subgroups of said register relays by way of the energizing windings thereof, means controlled by said energized register relays for disconnecting said control means from said control conductors, means for locking not more than one of said energized register relays in each of said subgroups in its energized position over its locking winding, a plurality of marking conductors, and means controlled by said locked register relays for selecting one of said marking conductors.

27. In a registration system comprising a group of register relays divided into subgroups, each of said relays provided with an energizing winding and a locking winding and contacts, a control conductor for each subgroup of register relays, each of said control conductors serially connected to all of the energizing windings of the register relays in the associated subgroup, means providing a plurality of different potentials, control means for selectively connecting said different potentials to each of said control conductors to energize the energizing windings of the register relays in each of said subgroups individually or in combinations, and an individual locking circuit for each of said subgroups including said locking windings and said contacts for locking not more than one register relay in its energized position in any one subgroup after said control means is disconnected from said control conductors.

28. In a registration system comprising a group of register relays divided into subgroups, each of said relays provided with an energizing winding and a locking winding and contacts, a control conductor for each subgroup of register relays, each of said control conductors serially connected to all of the energizing windings of the register relays in the associated subgroup, means providing a plurality of different potentials, control means for selectively connecting said different potentials to each of said control conductors to energize the energizing windings of the register relays in each of said subgroups individually or in combinations, an individual locking circuit for each of said subgroups including said locking windings and said contacts for locking not more than one register relay in its energized position in any one subgroup after said control means is disconnected from said control conductors, a plurality of marking conductors, and additional contacts on said register relays for selecting one of said marking conductors in accordance with only said register relays that are retained energized over said locking windings.

29. A registration system comprising a group of register relays divided into subgroups, each relay provided with an energizing winding, a control conductor for each of said subgroups, each of said control conductors connected in series to the energizing windings of the register relays in the associated subgroup, means providing a plurality of different potentials, control means operative to energize simultaneously one or more of said energizing windings in each of said subgroups over its associated control conductor, said control means applying said different potentials to said control conductors to energize the energizing windings of said group of register relays, one or more of said register relays in each of said subgroups operating in accordance with the potential applied to the associated subgroup control conductor, a locking winding for each of said relays, and means including contacts on said relays for locking operated over said locking windings only one of said relays in each of said subgroups regardless of the number of relays energized in series in each of said subgroups over said energizing windings.

30. In a registration system arranged to register any one of a plurality of different items of information comprising a group of register relays divided into a first subgroup and a second subgroup, each of said relays having an operating winding, a first control circuit including all of the windings of said first subgroup register relays, a second control circuit including all of the windings of said second subgroup register relays, means providing a plurality of different potentials, means for momentarily applying said different potentials to said control circuits in order simultaneously to operate any number of said first and second subgroup register relays, and a locking circuit for said first and second subgroup register relays including contacts on said register relays for retaining operated only one of said register relays in each of said subgroups after said control circuits are disconnected regardless of the number of relays operated over said control circuits in order to retain different relays operated in said subgroups to selectively register said different items.

31. In a telephone system, a line, a station on said line having an individual multi-digit number, a finder having access to said line, means operated responsive to the initiation of a call at said station for marking said line and for causing said finder to find and connect with said marked line, a plurality of groups of marking conductors, a source of potential, a like plurality of groups of marking relays, a register mechanism having a corresponding plurality of groups of register relays, a pair of control conductors for each of said groups of register relays, means controlled responsive to said connection of said finder to said marked line for applying said source of potential to a marking conductor in each of said groups in said marking conductors in order to operate a marking relay in each of said groups of marking relays, means controlled responsive to the operation of each of said marking relays for selecting at least one conductor of the pair of control conductors individual to the corresponding group of register relays in order to operate at least one register relay in each of the corresponding groups of register relays, and means controlled by said operated register relays in each of said groups of register relays for respectively registering one of the digits of said multi-digit station number thereby to register in said register mechanism all of the digits of said multi-digit station number.

32. In a telephone system, a group of lines, each of said lines having an individual multi-digit designation, a finder switch having access to said lines, a plurality of wipers and a switching relay for said switch, means operated responsive to a call on any one of said lines for operating said finder to search for said one calling line and for terminating said searching operation when said one calling line is found, a plurality of groups of marking conductors, a source of marking potential, means controlled responsive to the termination of said searching operation for connecting said source of marking potential to a marking conductor in each of said groups of marking conductors in accordance with a digit of said calling line designation one of said marking conductors in one of said groups connected to one of said finder switch wipers and said calling line, another of said marking conductors in another of said groups including another one of said finder switch wipers, a further of said marking conductors in still another of said groups including said finder switching relay, a register, and means controlled over said marking conductors for registering in said register said calling line multi-digit designation.

RUDOLPH FRANK STEHLIK.

REFERENCES CITED

The following references are of record in the file of this patent:

UNITED STATES PATENTS

| Number | Name | Date |
|---|---|---|
| 2,201,651 | Hatton | May 21, 1940 |
| 2,297,365 | Ostline | Sept. 29, 1942 |
| 2,370,736 | Kittredge | Mar. 6, 1945 |
| 2,402,700 | Williams | June 25, 1946 |
| 2,408,433 | Malthover | Oct. 1, 1946 |